US011068739B1

(12) United States Patent
Ducrocq

(10) Patent No.: US 11,068,739 B1
(45) Date of Patent: Jul. 20, 2021

(54) METHOD AND SYSTEM FOR COMPARISON OF OBJECT CONTOURS

(71) Applicant: MATROX ELECTRONIC SYSTEMS LTD., Dorval (CA)

(72) Inventor: Émile Ducrocq, Laval (CA)

(73) Assignee: MATROX ELECTRONIC SYSTEMS LTD., Dorval (CA)

( * ) Notice: Subject to any disclaimer, the term of this patent is extended or adjusted under 35 U.S.C. 154(b) by 10 days.

(21) Appl. No.: 16/267,379

(22) Filed: Feb. 4, 2019

(51) Int. Cl.
  *G06K 9/46* (2006.01)
  *G06T 7/73* (2017.01)
  *G06T 7/13* (2017.01)

(52) U.S. Cl.
  CPC .............. *G06K 9/4604* (2013.01); *G06T 7/13* (2017.01); *G06T 7/73* (2017.01); *G06T 2207/20116* (2013.01)

(58) Field of Classification Search
  CPC ........... G06K 9/4604; G06T 7/13; G06T 7/73; G06T 2207/20116
  See application file for complete search history.

(56) References Cited

U.S. PATENT DOCUMENTS

| 9,858,659 B2 | 1/2018 | Minakawa et al. | |
| 2002/0004710 A1* | 1/2002 | Murao | G06F 30/00 702/167 |
| 2008/0144922 A1* | 6/2008 | Naiki | G03F 9/7092 382/145 |

OTHER PUBLICATIONS

Morris O.J., et al., "Graph Theory for Image Analysis: An Approach Based on the Shortest Spanning Tree," IEE Proceedings F—Communications, Radar and Signal Processing, vol. 133 (2), Apr. 1986, pp. 146-152.
Suk M., et al., "Curvilinear Feature Extraction Using Minimum Spanning Trees." Computer vision, graphics and image processing, vol. 26 (3), Jun. 1984, pp. 400-411.
Peng, Bo, et al., "A survey of graph theoretical approaches to image segmentation", Pattern Recognition, vol. 46, 2013, pp. 1020-1038.
Tupin, Florence, "Graphs for image processing, analysis and pattern recognition", Telecom ParisTech—LTCI, retrieved from https://perso.telecom-paristech.fr/tupin/cours/IMA204/graphes.pdf on Aug. 22, 2018, 93 pages.

\* cited by examiner

*Primary Examiner* — John B Strege
(74) *Attorney, Agent, or Firm* — Nicholson De Vos Webster & Elliott LLP

(57) ABSTRACT

A method and a system of object contours comparisons are described. A first tree structure that connects all points of a set of points is determined such that a length of the first tree structure is smaller than a length of any other possible tree structures for connecting all points. Based on the first tree structure, a first subset of the set of points is determined such that it includes points ordered to form a path that satisfies a selection criterion for representing a first contour of a first object. From the first subset of points and a second set of points that forms a contour of a second object, a set of points of interest is determined. The first object and the second object are compared based on characteristics of the shape indicative of a difference between the first and the second contours formed by the points of interest.

21 Claims, 18 Drawing Sheets

DETERMINE, BASED ON THE FIRST TREE STRUCTURE, A FIRST SUBSET OF THE SET OF POINTS THAT IS ORDERED FROM A FIRST INITIAL POINT TO A FIRST END POINT TO FORM A FIRST PATH THAT SATISFIES A SELECTION CRITERION FOR REPRESENTING THE FIRST CONTOUR OF THE FIRST OBJECT
206

DETERMINE FROM ONE OR MORE PATHS IN THE FIRST TREE STRUCTURE THE FIRST PATH THAT SATISFIES THE SELECTION CRITERION FOR REPRESENTING THE FIRST CONTOUR OF THE FIRST OBJECT
302

WHERE THE SELECTION CRITERION INCLUDES THE GREATEST NUMBER OF POINTS FROM THE SET OF POINTS
312

WHERE THE SELECTION CRITERION INCLUDES THE GREATEST ACCUMULATED LENGTH
314

WHERE THE SELECTION CRITERION INCLUDES THE MOST DENSE SET OF POINTS
316

Figure 3

DETERMINE, BASED ON THE FIRST TREE STRUCTURE, A FIRST SUBSET OF THE SET OF POINTS THAT IS ORDERED FROM A FIRST INITIAL POINT TO A FIRST END POINT TO FORM A FIRST PATH THAT SATISFIES A SELECTION CRITERION FOR REPRESENTING THE FIRST CONTOUR OF THE FIRST OBJECT
206

DETERMINE ONE OR MORE SUB-TREE STRUCTURES FROM THE TREE STRUCTURE, WHERE THE DISTANCE BETWEEN EACH TWO CONNECTED POINTS IN THE SUB-TREE IS LESS THAN A PREDETERMINED THRESHOLD DISTANCE
402

THE SUB-TREE STRUCTURES RESULT FROM DISCONNECTING ANY TWO CONNECTED POINTS OF THE TREE STRUCTURE WHEN THE DISTANCE BETWEEN THE TWO CONNECTED POINTS IS GREATER THAN THE PREDETERMINED THRESHOLD DISTANCE
404

DETERMINE A SECOND TREE STRUCTURE FROM THE SUB-TREE STRUCTURES WHERE THE SECOND TREE STRUCTURE CONNECTS ALL THE SUB-TREE STRUCTURES AND INCLUDES A PATH THAT SATISFIES THE SELECTION CRITERION AND THAT IS SMALLEST IN LENGTH THAN ANY OTHER PATHS SATISFYING THE SELECTION CRITERION
406

DETERMINE FROM ONE OR MORE PATHS IN THE SECOND TREE STRUCTURE THE FIRST PATH THAT SATISFIES THE SELECTION CRITERION FOR REPRESENTING THE FIRST CONTOUR OF THE FIRST OBJECT
408

WHERE THE SELECTION CRITERION INCLUDES THE GREATER NUMBER OF POINTS FROM THE SET OF POINTS
412

WHERE THE SELECTION CRITERION INCLUDES THE GREATEST ACCUMULATED LENGTH
414

WHERE THE SELECTION CRITERION INCLUDES THE MOST DENSE SET OF POINTS
416

Figure 4

DETERMINE, FROM THE FIRST SUBSET OF POINTS AND A SECOND SET OF POINTS THAT FORMS A SECOND CONTOUR OF A SECOND OBJECT, A SET OF POINTS OF INTEREST THAT FORMS A SHAPE INDICATIVE OF A DIFFERENCE BETWEEN THE FIRST CONTOUR OF THE FIRST OBJECT AND THE SECOND CONTOUR OF THE SECOND OBJECT
208

DETERMINE A SECOND INITIAL POINT OF THE SECOND SET OF POINTS THAT CORRESPONDS TO THE FIRST INITIAL POINT OF THE FIRST SUBSET OF POINTS
702

DETERMINE A THIRD INTERSECTION POINT OF A FIFTH SEGMENT AND A SIXTH SEGMENT, WHERE THE FIFTH SEGMENT IS FORMED BY TWO SUCCESSIVE POINTS FROM THE FIRST SUBSET OF POINTS THAT SUCCEED THE FIRST INITIAL POINT ALONG THE FIRST PATH AND THE SIXTH SEGMENT IS FORMED BY TWO SUCCESSIVE POINTS FROM THE SECOND SET OF POINTS THAT SUCCEED THE SECOND INITIAL POINT
704

SELECT THE SET OF POINTS OF INTEREST FROM THE FIRST SUBSET OF POINTS AND THE SECOND SET OF POINTS TO INCLUDE THE FIRST INITIAL POINT, THE SECOND INITIAL POINT, THE THIRD INTERSECTION POINT, AND ALL POINTS FROM THE FIRST SUBSET OF POINTS AND FROM THE SECOND SET OF POINTS THAT RESPECTIVELY SUCCEED THE FIRST INITIAL POINT AND THE SECOND INITIAL POINT, AND WHICH ARE PRIOR TO THE THIRD INTERSECTION POINT
706

Figure 7A

DETERMINE, FROM THE FIRST SUBSET OF POINTS AND A SECOND SET OF POINTS THAT FORMS A SECOND CONTOUR OF A SECOND OBJECT, A SET OF POINTS OF INTEREST THAT FORMS A SHAPE INDICATIVE OF A DIFFERENCE BETWEEN THE FIRST CONTOUR OF THE FIRST OBJECT AND THE SECOND CONTOUR OF THE SECOND OBJECT
208

DETERMINE A FIRST INTERSECTION POINT OF A FIRST SEGMENT FORMED BY TWO SUCCESSIVE POINTS FROM THE FIRST SUBSET AND A SECOND SEGMENT FORMED BY TWO SUCCESSIVE POINTS FROM THE SECOND SET OF POINTS
712

DETERMINE A SECOND INTERSECTION POINT OF A THIRD SEGMENT AND A FOURTH SEGMENT, WHERE THE THIRD SEGMENT IS FORMED BY TWO SUCCESSIVE POINTS FROM THE FIRST SUBSET OF POINTS THAT SUCCEED THE FIRST INTERSECTION POINT ALONG THE FIRST PATH AND THE FOURTH SEGMENT IS FORMED BY TWO SUCCESSIVE POINTS FROM THE SECOND SET OF POINTS THAT SUCCEED THE FIRST INTERSECTION POINT
714

SELECT THE SET OF POINTS OF INTEREST FROM THE FIRST SUBSET OF POINTS AND THE SECOND SET OF POINTS TO INCLUDE THE FIRST INTERSECTION POINT, THE SECOND INTERSECTION POINT, AND ALL POINTS FROM THE FIRST SUBSET OF POINTS AND FROM THE SECOND SET OF POINTS THAT SUCCEED THE FIRST INTERSECTION POINT AND ARE PRIOR TO THE SECOND INTERSECTION POINT
716

Figure 7B

DETERMINE, FROM THE FIRST SUBSET OF POINTS AND A SECOND SET OF POINTS THAT FORMS A SECOND CONTOUR OF A SECOND OBJECT, A SET OF POINTS OF INTEREST THAT FORMS A SHAPE INDICATIVE OF A DIFFERENCE BETWEEN THE FIRST CONTOUR OF THE FIRST OBJECT AND THE SECOND CONTOUR OF THE SECOND OBJECT
208

DETERMINE A FOURTH INTERSECTION POINT OF A SEVENTH SEGMENT FORMED BY TWO SUCCESSIVE POINTS FROM THE FIRST SUBSET AND AN EIGHTH SEGMENT FORMED BY TWO SUCCESSIVE POINTS FROM THE SECOND SET OF POINTS
722

DETERMINE THAT THERE ARE NO MORE INTERSECTIONS OF SEGMENTS FORMED BY SUCCESSIVE POINTS FROM THE FIRST SUBSET OF POINTS AND THE SECOND SET OF POINTS
724

SELECT THE SET OF POINTS OF INTEREST FROM THE FIRST SUBSET OF POINTS AND THE SECOND SET OF POINTS TO INCLUDE THE FOURTH INTERSECTION POINT, THE FIRST END POINT, THE SECOND END POINT, AND ALL POINTS FROM THE FIRST SUBSET OF POINTS AND FROM THE SECOND SET OF POINTS THAT RESPECTIVELY SUCCEED THE FOURTH INTERSECTION POINT AND WHICH ARE PRIOR TO THE FIRST END POINT AND THE SECOND END POINT
726

Figure 7C

```
┌─────────────────────────────────────────────────────────────────┐
│  DETERMINE ONE OR MORE CHARACTERISTICS OF THE SHAPE FORMED BY   │
│  THE SET OF POINTS OF INTEREST TO COMPARE THE FIRST OBJECT AND  │
│  THE SECOND OBJECT                                              │
│  210                                                            │
└─────────────────────────────────────────────────────────────────┘

┌──────────────────────────────────────────────────┐
        │  DEFINE BASED ON A PREDETERMINED POINT AND A     │
        │  PREDETERMINED DIRECTION, AN ORIENTATION IN THE  │
        │  COORDINATE SYSTEM                               │
        │  802                                             │
        └──────────────────────────────────────────────────┘
                              │
                              ▼
        ┌──────────────────────────────────────────────────┐
        │  DETERMINE, BASED ON THE ORIENTATION, A SIGN OF  │
        │  THE AREA OF THE SHAPE FORMED BY THE FIRST       │
        │  SUBSET OF POINTS                                │
        │  804                                             │
        └──────────────────────────────────────────────────┘
                              │
                              ▼
        ┌──────────────────────────────────────────────────┐
        │  WHERE TO COMPARE THE FIRST OBJECT AND THE       │
        │  SECOND OBJECT IS BASED ON THE SIGN OF THE AREA  │
        │  806                                             │
        └──────────────────────────────────────────────────┘
```

Figure 8

METHOD AND SYSTEM FOR COMPARISON OF OBJECT CONTOURS

TECHNICAL FIELD

Embodiments of the invention relate to the field of image processing, and more specifically, to the comparison of object contours.

BACKGROUND ART

A common problem in image processing environments is the comparison of an object detected in a target image with a model of that object. In particular, some image processing applications attempt to compare points extracted from images with a contour of a model object. Typically, one or more captured images are used to extract a set of points representing the contour of an object and this set of points is used to compare a contour of an object determined in these images with the contour of the model.

The set of points extracted from images may be obtained through multiple point extraction mechanisms. For example, the set of points can be points of a two-dimensional (2D) profile, points of a three-dimensional profile, or points of a three-dimensional cross-section. The points of the 2D profile can be obtained from the acquisition of a 2D profile image of an object (e.g., where the object is backlit with a light source) and the extraction of edge points from the acquired 2D profile image. The 3D profile points can be obtained from the acquisition of a 3D profile image of an object illuminated by a sheet of light (e.g., a laser) and extracting points of the sheet of light from the acquired 3D profile image. The 3D model cross-section points can be obtained by acquiring a 3D model (e.g., a depth map) by accumulating multiple 3D profiles and taking a cross section of the 3D model. The set of points obtained is typically not ordered, not equally spaced, or may contain outlier points that should not be part of the contour of the object (e.g., noise, other objects in the image, etc.). Thus, the set of points extracted renders the profile comparison very complex.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3 illustrates a flow diagram of exemplary operations that are performed to determine the first subset of points, in accordance with some embodiments.

FIG. 4 illustrates a flow diagram of exemplary operations that are performed to determine the first subset of points, in accordance with some embodiments.

FIG. 7A illustrates a flow diagram of exemplary operations for determination of a set of points of interest, in accordance with some embodiments.

FIG. 7B illustrates a flow diagram of exemplary operations for determination of a set of points of interest, in accordance with some embodiments.

FIG. 7C illustrates a flow diagram of exemplary operations for determination of a set of points of interest, in accordance with some embodiments.

FIG. 8 illustrates a flow diagram of exemplary operations for determining characteristics of a shape, in accordance with some embodiments.

DESCRIPTION OF EMBODIMENTS

Figure 1A:
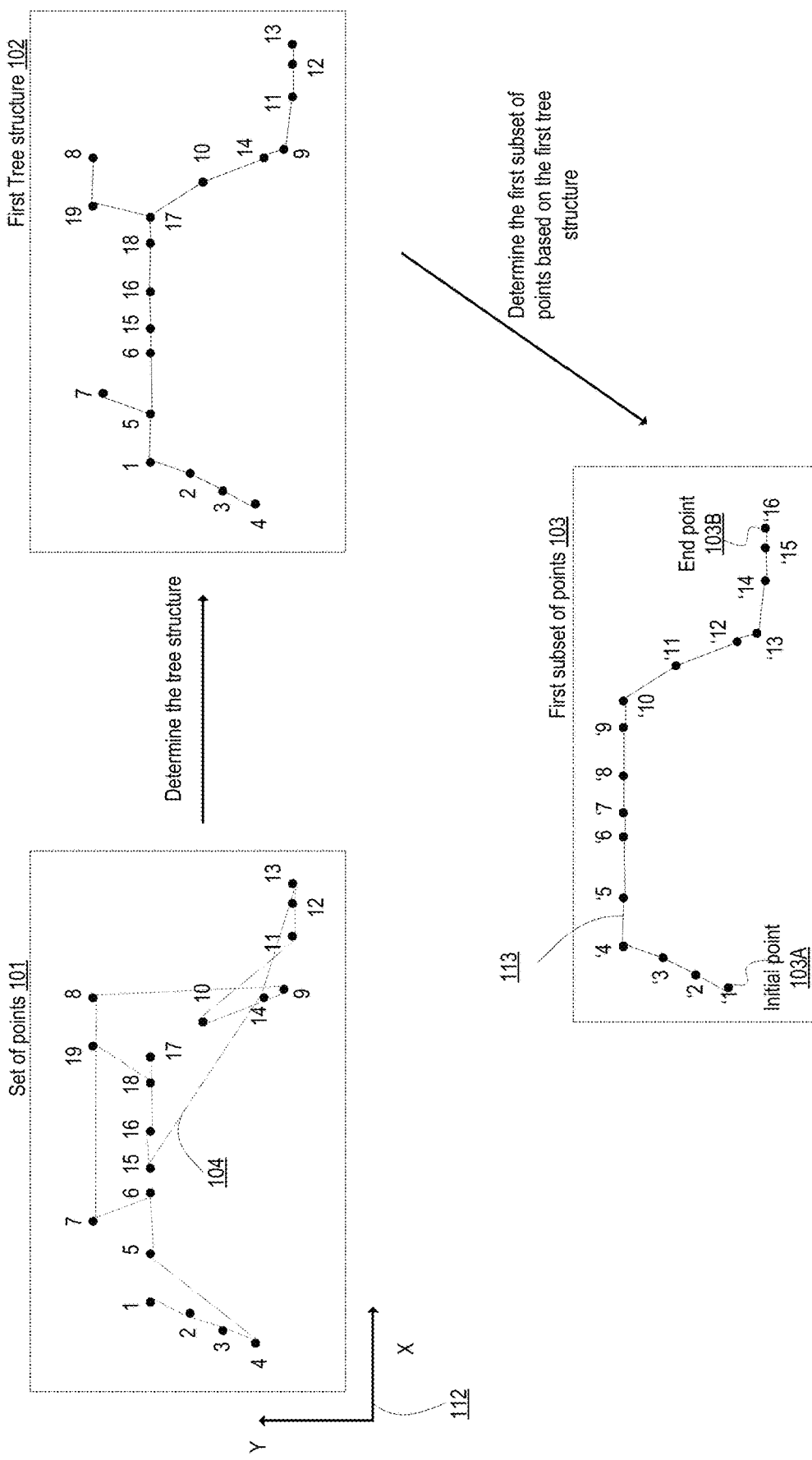
FIG. 1A illustrates a block diagram of an exemplary set of points that can be used for comparison of a contour of an object, in accordance with some embodiments.

In the following description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview:

The following description describes methods and apparatuses for comparison of object contours.

The embodiments described herein allow comparison of contours of objects when the information input to the system is a set of points. Each one of the points from the set of points includes coordinates in a coordinate system. The coordinate system can be a two-dimensional coordinate system or a three-dimensional coordinate system. As it will be discussed in further details below, the set of points may be obtained through multiple point extraction mechanisms. The set of points is typically provided in an order that is not representative of a contour of the object. Additionally, the points may not be equally spaced in the coordinate system and may contain outlier points that should not be part of the contour of the object (e.g., noise, other objects in the image, etc.). When two contours are to be compared and each one of the contours is represented with a set of points, there is a need for a robust and efficient method that is robust and that is tolerant to noise.

The embodiments herein describe a method and a system of object contours comparisons. A set of points is received. Each point from the set of points includes a set of coordinates in a coordinate system. A first tree structure that connects all points of the set of points is determined. The first tree structure is determined such that a length of the first tree structure is smaller than a length of any other possible tree structures for connecting all points of the set of points. The length of the tree structure is determined based on distances in the coordinate system between pairs of points of the set of points. Based on the first tree structure, a first subset of the set of points is determined such that the first subset of points includes points ordered from a first initial point to a first end point to form a path that satisfies a selection criterion for representing a first contour of a first object. From the first subset of points and a second set of points that forms a second contour of a second object, a set of points of interest that forms a shape indicative of a difference between the first contour of the first object, and the second contour of the second object is determined. One or more characteristics of the shape formed by the set of points of interest are determined to compare the first object and the second object.

The embodiments described herein enable an efficient determination of a contour of an object from a set of points as well as an efficient and accurate determination of differences between two contours (e.g., a target object with a desired model object). Further, the mechanisms described have less requirements in terms of the inputs to be analyzed. For example, the mechanisms do not require that the set of points representing the contour of the object to be ordered or equally spaced. Further, the mechanisms can be applied on a set of points that include outlier points that are not part of the contour. The comparison of the contours enables identification of defects in the object and determination of whether or not these defects can be corrected. The comparison of the objects can further be used to determine the state of wear of an object, a misalignment of the tool used to manufacture the object, or to determine other characteristics of the object (such as desired volume, shape, or area, etc.).

Figure 10A:
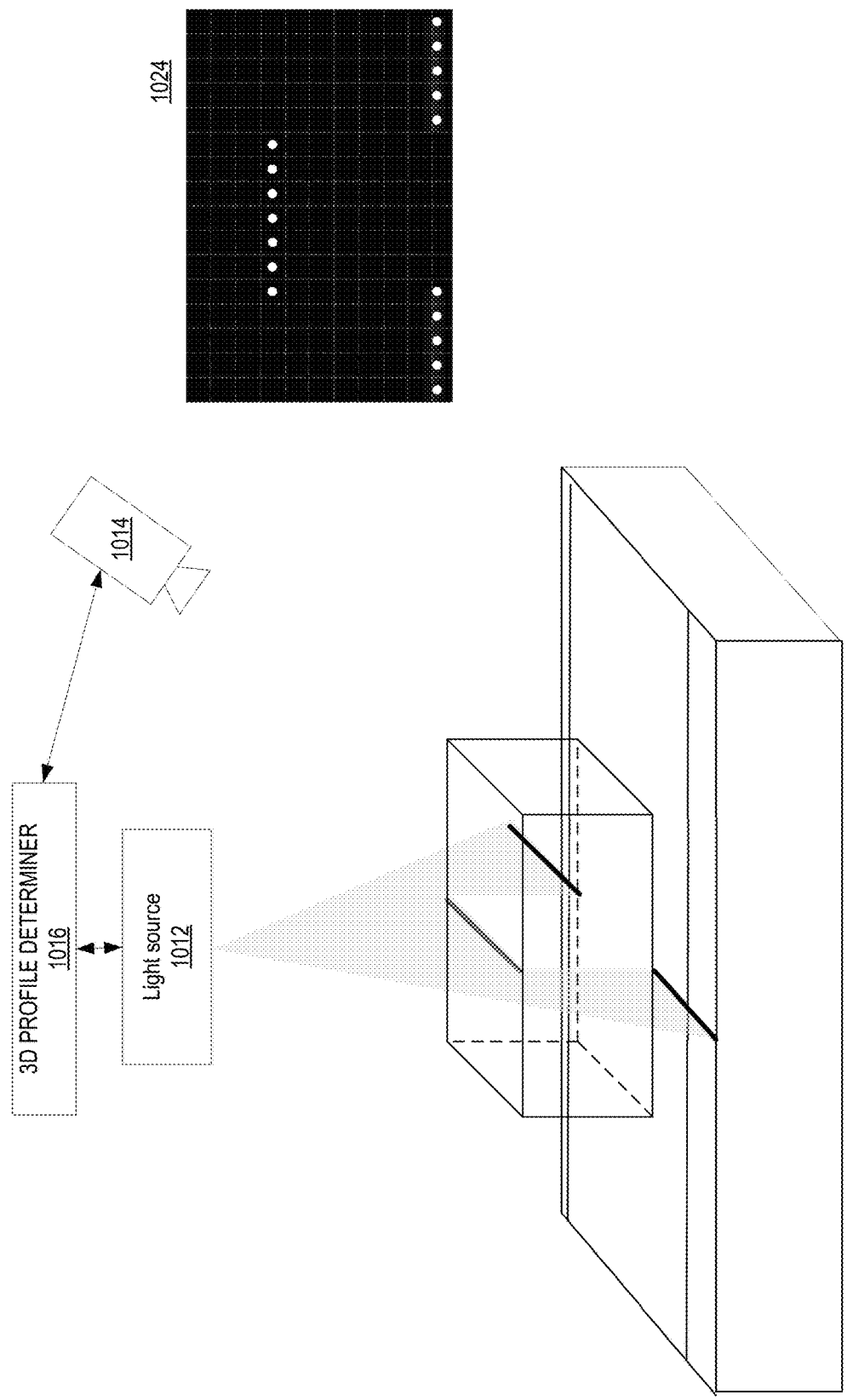
FIG. 10A illustrates a block diagram of an exemplary object illuminated by a sheet of light, in accordance with some embodiments.

The following embodiments will be described with a first object of which the contour is to be compared with the contour of a second object. The second object can be referred to as the model object, where the model object is without defect or has a size and measurements that are ideal. The contour of the first object that is to be compared can be the entire contour of the object, or alternatively, a portion of the entire contour of the object. For example, with reference to FIGS. 1A-B and FIG. 5 (below), the points 101 or the points 501 can be a portion of a contour of a larger object as illustrated in FIG. 10. Thus, the operations described herein can be performed on points that are a subset of all the points detected for the object as it is the case in the example of FIGS. 1A-B, or in other examples, it can receive a larger set of points 1003 that represent the entire object. Further, the operations herein can be performed on a set of points that form a closed contour (e.g., the entire points forming the contour of 1003) or alternatively on an open contour (e.g., the set of points 101 or 501) without departing from the scope of the present invention.

The operations in the following flow diagrams will be described with reference to the exemplary points of FIGS. 1A-B or FIG. 5. However, it should be understood that the operations in the flow diagrams can be used on examples of points other than those discussed with reference to FIGS. 1A-B and 5. The embodiments described herein can be performed by a contour comparison module.

Figure 1B:
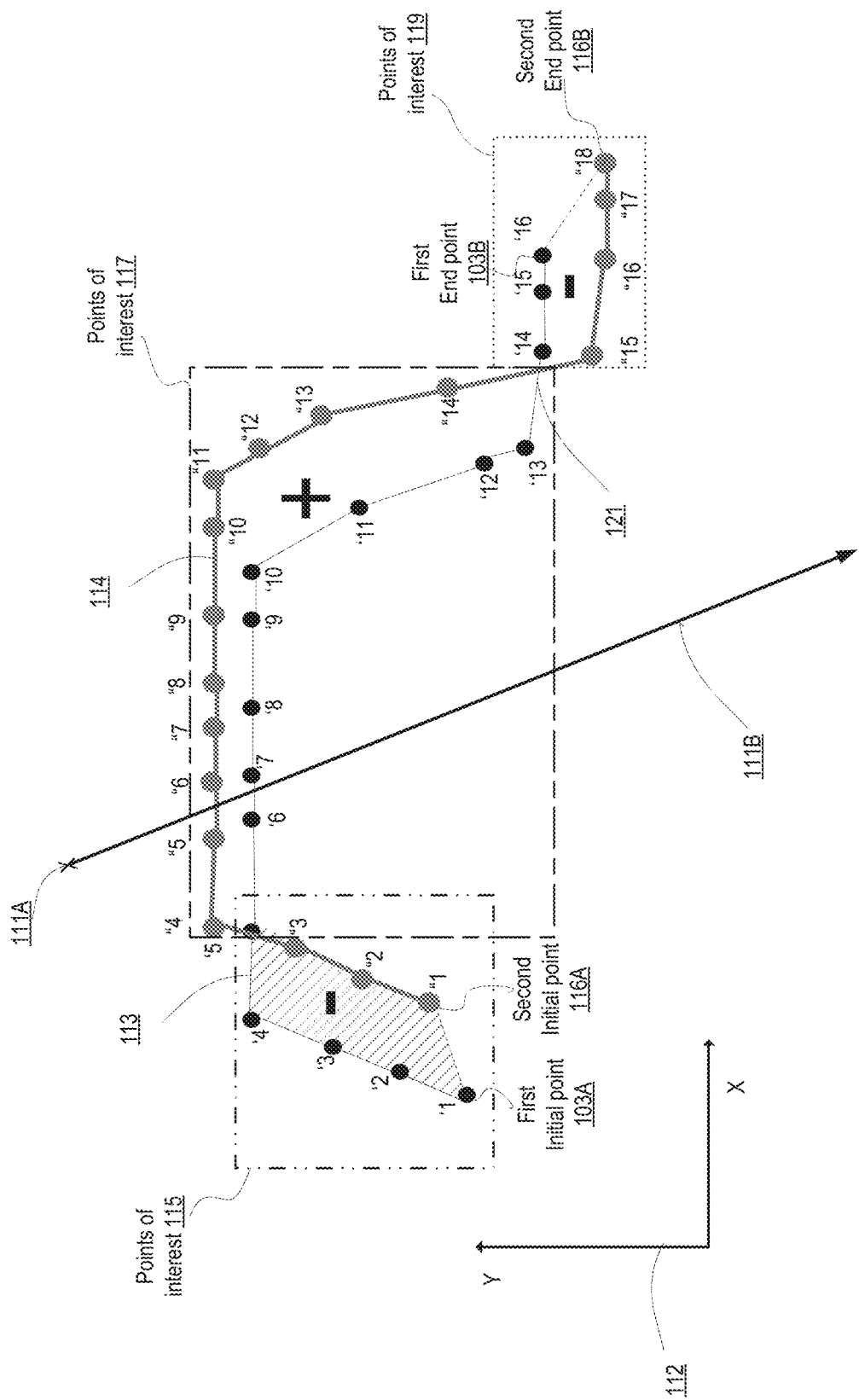
FIG. 1B illustrates a block diagram of sets of points of interest determined from a first subset of points and a second set of points, in accordance with some embodiments.
Figure 2:
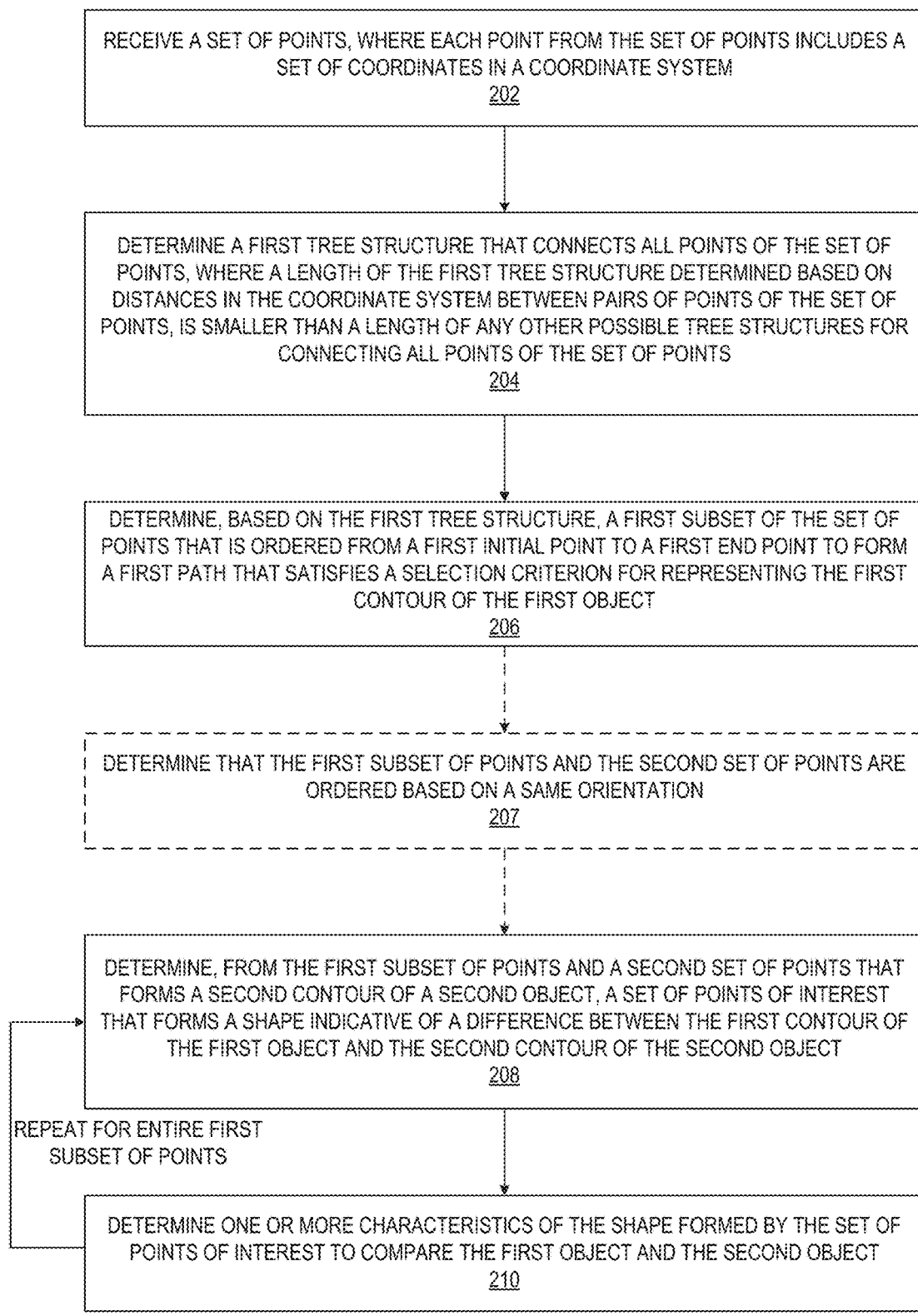
FIG. 2 illustrates a flow diagram of exemplary operations for comparing contours of two objects, in accordance with some embodiments.

FIG. 1A illustrates a block diagram of an exemplary set of points that can be used for comparison of a contour of an object, in accordance with some embodiments. FIG. 2 illustrates a flow diagram of exemplary operations for comparing contours of two objects, in accordance with some embodiments. At operation 202, the set of points 101 is received. The set of points 101 is a result of extraction of points from one or more images where the points are likely to be part of a contour of an object. For example, the set of points can be edge points extracted from an image, points of a sheet of light extracted from an image, or points of a cross section of a 3D reconstruction of the object. The extraction of points from images is described in further details with respect to FIG. 9 and FIGS. 10A-B. However, other mechanisms can be used to extract points from images or determine a set of points that is representative of the contour of an object without departing from the scope of the present invention.

For the purpose of discussion in the present disclosure, each one of the points can be identified by an index from 1-19. Each one of the set of points 101 is associated with a set of coordinates (x, y) in the coordinate system 112. While the set of points is illustrated in FIG. 1A as a graph in which the points are represented based on their coordinates in the coordinate system 112, one of ordinary skill in the art would understand that the set of points is received in the system as a list of points or any other type of data structure in which each point is associated with its coordinates. For example, the indices do not indicate an order of the points corresponding to the contour of the object that is to be analyzed. The set of points as received does not include an indication of the spatial distribution of the points and how they are to be connected to form the contour of an object. Also, the set of points can contain outlier points coming from either acquisition noise or cross-section projection (e.g., 2*d*-profile from a 3d point cloud). For example, the set of points may be received in the order that is indicated by the indices 1-19. The path 104 represents the path that would be obtained if the points were connected, based on the indices received to form the contour of the object. However, this contour (i.e., path 104) is not representative of the real contour of the object and therefore there is a need for determination of a first subset of points 103 that is ordered to form a path representative of the contour of the object. In addition, the set of points may include outlier points that are not part of the contour of the object (such as points 7, 19, and 8). These outlier points may be the result of noise extracted in the image(s) when the points were extracted.

At operation 204, a determination of a first tree structure that connects all points of the set of points is performed. A length of the first tree structure is determined based on distances in the coordinate system between pairs of points of the set of points and the length of the first tree structure is smaller than a length of any other possible tree structures for connecting all points of the set of points. In addition, the first tree structure is determined such that there are no intersections of segments formed by connected points in the tree. Referring to FIG. 1A, the tree structure 102 that is obtained includes all the points from the set of points 101 and no segments formed by pairs of points cross. For example, the first tree may not include a connection such as the one illustrated in the set 101 where a segment between index 9 and index 8 crosses the segment between index 14 and index 13. Several mechanisms can be used to determine the first tree structure. For example, a minimum spanning tree mechanism can be used based on the distances between pairs of points in the set of points 101 to determine the tree structure 102.

In one embodiment, performing a minimum spanning tree mechanism includes the following exemplary operations. The distances between each two pairs from the set of points 101 are calculated. The distances are ordered in an increasing order such that the smallest distance is set as an initial distance, and the greater distance is set as the last distance. Based on the ordered distances and starting from the first two points that are associated with the initial distance (i.e., the minimum distance, which is smaller than any other distance between points of the set of points 101) each two points that are not yet connected are connected while ensuring that no segment between two points crosses another segment between two other points from the set of points and until all points of the set of points 101 are connected. Other implementations of a minimum spanning tree mechanism can be used without departing from the scope of the present invention.

At operation 206, the contour comparison module determines, based on the first tree structure 102, a first subset 103 of the set of points that is ordered from a first initial point 103A to a first end point 103B to form a path 113 that satisfies a selection criterion for representing a first contour of a first object. The path 113 determines an order of the points from the first subset 103 that corresponds to the contour of the first object. In some embodiments, the first subset (e.g., 103) is less than the entire set of points received.

Once the first subset of points is obtained, the contour comparison module may use this set of points in the order obtained to compare the contour of the first object with a second set of points that forms the contour of a second object (e.g., a model object, or another object detected at a different time during an inspection process, etc.). In some embodiments, the second set of points and the first subset of points may not be ordered according to the same orientation. While the second set of points in FIG. 1B is illustrated according to an order that defines the path 114 from a second initial point 116A to a second end point 116B, in an alternative embodiment, the second set of points may be received by the contour comparison module ordered from the second end point 116B to the second initial point 116A such that the second set of points is not ordered according to a same orientation as the first subset of points (from initial point 103A to end point 103B). In these embodiments, the contour comparison module is operative to perform operation 207 to determine that the first subset of points and the second set of points are ordered based on a same orientation.

In some embodiments, determining that the first subset and the second set of points are ordered based on a same orientation includes determining whether they have different orientations and reordering one of the sets of points if the orientation is different.

In a first embodiment, when the contour of the object to be compared is an open curve, the following operations are performed to determine whether the first subset of points and the second set of points are ordered based on the same orientation. A distance (d(116A,103A)) between the second initial point (e.g., 116A) and the first initial point (103A) is added to the distance (d(116B,103B)) between the second end point 116B and the first end point 103B, and compared with the distance (d(116A,103B)) between the second initial point (e.g., 116A) and the first end point (103B) when added to the distance (d(116B,103A)) between the second end point 116B and the first initial point 103A. When d(116A, 103A)+d(116B,103B) is smaller than d(116A,103B)+d(116B,103A) the orientation of the paths 113 and 114 is determined to be the same and nothing is done to change the orientations of any of the paths. Alternatively, when d(116A, 103A)+d(116B,103B) is greater than d(116A,103B)+d(116B,103A) this indicates that the first subset of points and the second set of points are oriented according to different orientations. In this case, the second set of points is reordered such that the previous end point becomes the new initial point of the path and the previous initial point becomes the new end point.

In a second embodiment, when the contour of the object to be compared is a closed curve, the following operations are performed to determine whether the first subset of points and the second set of points are ordered based on the same orientation. In these embodiments, each one of the first subset of points and the second set of points form a respective closed curve and each curve has a respective area enclosed within the curve. A sign is determined for each one of the areas (the first area corresponding to the first subset of points, and the second area corresponding to the second set of points). If the signs of the two areas are opposed, this indicates that the two paths formed by the first subset of points and the second set of points respectively are oriented in opposing orientations. Thus, when the signs of the two areas are opposed, the order of the second set of points is inverted. If the signs of the two areas are not opposed this indicates that the two paths are oriented in the same orientation and there is no need to change the orientation of any of the paths.

In some embodiments, the determination of a sign of an area enclosed within a curve is performed as described with respect to FIG. 8. Other mechanisms can be used to determine the orientation of a closed curve/path without departing from the scope of the present invention.

Referring back to FIG. 2, the flow of operations moves from operation 206 or alternatively from operation 207 to operation 208. At operation 208, the contour comparison module determines, from the first subset of points 103 and a second set of points that forms the second contour 114 of the second object, a set of points of interest. The set of points of interest forms a shape indicative of a difference between the first contour of the first object and the second contour of the second object. In the illustrated example of FIG. 1B, 115, 117, and 119 are three examples of sets of points of interest that can be determined from the first subset of points 103 (that forms the path 113) and the second set of points that forms the path 114.

The flow of operations then moves to operation 210, at which the contour comparison module determines one or more characteristics of the shape formed by the set of points of interest to compare the first object and the second object.

The operations of 208 and 210 can be repeated until all the points in each one of the first subset of points 103 and the second set of points are processed. Thus, while in some embodiments, the contour comparison module may determine a single set of points of interest in other embodiments, the contour comparison module may determine two or more sets of points of interest. The process can be performed recursively until all points from the sets of points are processed. For example, the result of operation 208 and 210 can be the first set of points of interest 115, in another iteration of execution of these same operations the result can be the set 117 and in a last iteration of the same operations 208-210, the result can be the set 119.

While the embodiments of FIG. 2 are discussed with a set of points 101 that is received such that the order of the points is not known and the subset of points that form the contour of the object needs to be determined, in other embodiments, the first set of points is received such that it is already ordered and representative of the contour of the first object. In these embodiments, the operations of the flow diagram of FIG. 2 can include operations 207 to 210 and operations 204 and 206 are skipped.

Contour Determination

Determination of a Contour of a First Object

Once a tree structure is determined, several mechanisms can be used to determine the first subset of points that is ordered to form a path representative of the first contour of the first object. Operation 206 of FIG. 2 can be performed according to multiple embodiments.

FIG. 3 illustrates a flow diagram of exemplary operations that are performed to determine the first subset of points in accordance with a first embodiment. In these embodiments, operation 206 includes operation 302 at which a path is determined such that it satisfies the selection criterion for representing the first contour of the first object from one or more paths in the first tree structure 102. The first subset of points are the points that form the path.

Referring back to FIG. 1A, the first tree structure 102 includes several paths. A path in a tree includes a set of points that are connected and traversed in a given direction with an initial point and an end point. Each one of the initial point and the end point do not have more than one connection to other points of the tree structure 102 (i.e., the initial point and the end point are leaf nodes of the tree structure 102). An example of path can be the path including the points 4, 3, 2, 1, 5, and 7. Another example of a path is the path including the points 7, 5, 6, 15, 16, 18, 19, and 8. Another example of path in the tree structure 102 is the path including the points 4, 3, 2, 1, 5, 6, 15, 16, 18, 17, 10, 14, 9, 11, 12, and 13. Other paths, not enumerated here, can be present in the first tree structure 102.

The operation 302 includes determining from these multiple paths of the first tree structure 102 a single path including the first subset of points 103 that satisfies a selection criterion for representing the contour of an object. Several selection criteria can be used to select the path. In one embodiment, the selection criterion includes criterion 312 which includes selecting the path with the greatest number of points from the set of points. For example, the first subset of points 103 is selected such that the path 113 includes the greater number of points connected in the first tree structure 102 when compared with the number of points of other possible paths in the first tree structure 102. In the illustrated example of FIG. 1A, the selected path 113 includes 16 points as opposed to a path in the first tree structure 102 including points (4, 3, 2, 1, 5, and 7), which would only include 6 points. In this example, the path 113 (or the subset of points 103 forming the path 113) is the path from the multiple paths in the tree structure 102 that includes a greater number of points than any other path in the tree structure. In other words, the path 113 is the path that satisfies the selection criterion, when the selection criterion is the path with the greatest number of points from the set of paths possible in the tree structure.

In another embodiment, the selection of the path and therefore of the first subset of points is performed based on the criterion 314, in which the path selected is the one that has the greatest length when compared to the lengths of the other possible paths. In another embodiment, the criterion to be satisfied is criterion 316, in which the selected path is the one with the most density in terms of points (e.g., comparing the different paths based on a number of points for the length of the path when projected according to a projection angle). In other embodiments, other types of selection criteria can be used to select the path from multiple possible paths in the first tree structure to represent the contour of the first object. Once the path 113 is selected, the points that form the path represent the first subset of points 103, and are traversed in an order that is representative of the contour of the object.

While the illustrated example shows that the first tree structure 102 can include multiple possible paths, in other embodiments the tree structure obtained can include only a single path and this path already satisfies the selection criterion. For example, when the tree structure includes only two leaf nodes (the initial point and the end point) the tree structure would include a single path and determining the path from the tree structure would result in the entire points of the tree structure as the path.

FIG. 4 illustrates a flow diagram of exemplary operations that are performed to determine the first subset of points, in accordance with a second embodiment. In some embodiments, the determination of the first tree structure may not result in a tree structure that includes a path that satisfies the selection criterion of the object to be detected. In these embodiments, the first tree structure obtained can be further processed in order to determine a second tree structure and extract from the second tree structure the first subset of points. FIG. 5 illustrates a block diagram of an exemplary tree structure that does not include a path that satisfies the selection criterion of the contour of the first object. The set of points 501 is received and processed to obtain the first subset of points 506 according to the operations of FIG. 2 and FIG. 4.

Each one of the set of points 501 is associated with a set of coordinates (x, y) in the coordinate system 112. While the set of points is illustrated in FIG. 5 as a graph in which the points are represented based on their coordinates in the coordinate system 112, one of ordinary skill in the art would understand that the set of points is received in the system as a list of points or any other type of data structure in which each point is associated with its coordinates. The indices do not indicate an order of the points corresponding to the contour of the object that is to be analyzed. The set of points 501 does not include an indication of the spatial distribution of the points and how they are to be connected to form the contour of an object. Also, the set of points can contain outlier points coming from either acquisition noise or cross-section projection (e.g., 2d-profile from a 3d point cloud). For example, the set of points 501 may be received in the order that is indicated by the indices 1-20.

A determination of a tree structure 502 that connects all points of the set of points 501 is performed. A length of the tree structure 502 is determined based on distances in the coordinate system between pairs of points of the set of points. The tree structure is determined such that its length is smaller than the length of any other possible tree structures for connecting all points of the set of points 501. In addition, the tree structure 502 is determined such that there are no intersections of the segments formed by connected points in the tree structure. Several mechanisms can be used to determine the tree structure 502 from the set of points 501. For example, a minimum spanning tree method can be used based on the distances between pairs of points in the set of points 501 to determine the tree structure 502.

In one embodiment, performing a minimum spanning tree mechanism to obtain the tree structure 502 includes the following operations. The distances between each two pairs from the set of points 501 are calculated. The distances are ordered in an increasing order such that the smallest distance is set as an initial distance and the greater distance is set as the last distance.

Based on the ordered distances, and starting from the first two points that are associated with the smallest distance (i.e., the minimum distance, which is smaller than any other distance between points of the set of points 501), connect the two points that yield the smallest distance if they are not connected. Moving to the next distance repeating the previous operation of connecting the points until all points of the set of points 501 are connected. While the tree structure 502 connects all points and has the smallest length when compared with other possible trees that may connect all points, this tree structure does not represent the contour of the first object. Once the tree structure 502 is obtained, the contour comparison module determines the first subset of points 506 based on the tree structure 502 by performing the operations of FIG. 4.

At operation 402, the contour comparison module determines one or more sub-tree structures from the tree structure such that the distance between each two connected points in the sub-tree is less than a predetermined threshold distance.

In some embodiments, the sub-tree structures are obtained by disconnecting (operation 404) any two connected points of the tree structure 502 when the distance between the two connected points is greater than the predetermined threshold distance. In the illustrated example of FIG. 5, the tree structure 502 is divided into three sub-tree structures 503A, 503B, and 503C, collectively referred to as the sub-tree structures 503.

At operation 406, the contour comparison module determines a second tree structure from the sub-tree structures where the second tree structure connects all the sub-tree structures and includes a curve that satisfies the selection criterion and that is smallest in length than any other paths that may satisfy the selection criterion. The second tree structure 504 is determined by attempting to connect leaves of a sub-tree with other leaves of the other sub-trees and determining whether the resulting tree, which includes all sub-trees, includes the path that satisfies the selection criterion. In the illustrated example, the selection criterion is the path that has the greatest number of points from the subset of points and the smallest length. Applying the selection criterion to the connection of the sub-trees results in obtaining the second tree structure 504. In some embodiments, the determination of the second tree structure 504 from the first tree structure 502 can be performed by other mechanisms without departing from the scope of the present invention.

Once the second tree is obtained, the flow of operations moves to operation 408, at which the contour comparison module determines from one or more paths in the second tree structure the path that satisfies the selection criterion for representing the first contour of the first object. In this step the points forming the path that satisfies the selection criterion are output as the first subset of points.

The operation 408 includes determining from these multiple paths in the second tree structure 504, a single path including the first subset of points 506, which is the path that satisfied the selection criterion for representing the contour of the object. The path is determined by an ordered subset of points (the first subset of points 506) from an initial point (with new index '1) to an end point (with new index '17). The path further does not include any outlier points (such as the point with index 13 or with index 5 in the set of points 501).

Several selection criteria can be used to select the path. In one embodiment, the selection criterion includes criterion 412 which is selecting the path with the greatest number of points from the set of points, and that has the smallest length. For example, the first subset of points 506 are selected such that the path 513 includes the greater number of points when compared with the number of points of other paths possible in the second tree structure 504. In the illustrated example of FIG. 5, the selected path 513 includes 17 points as opposed to a path in the second tree structure 506 including points (12, 2, 5), which would only include 3 points. In this example, the path 513 (or the subset of points 506 forming the path 513) is the path from the multiple paths in the tree structure 504 that includes a greater number of points than any other path in the tree structure. In other words, the path 513 is the path that satisfies the selection criterion, when the selection criterion is the path with the greatest number of points from the set of paths possible in the tree structure.

In another embodiment, the selection of the path and therefore of the first subset of points 506 is performed based on the criterion 414, in which the selected path has the greatest length when compared to the lengths of the other possible paths in the second tree structure 504. In another embodiment, the criterion to be satisfied is criterion 416, in which the selected path is the one with the most density in terms of points (e.g., comparing the different paths based on a number of points for a length of the path when projected according to a projection angle). In other embodiments, other types of selection criteria can be used to select the path from multiple possible paths in the second tree structure to represent the contour of the first object.

While the illustrated example shows that the second tree structure 504 can include multiple possible paths, in other embodiments, the tree structure obtained can include only a single path and this path already satisfies the selection criterion. For example, when the tree structure includes only two leaf nodes (i.e., a point that is connected to only a single one of the other points)—the initial point and the end point—in this case the tree structure would include a single path and determining the path from the tree structure results in the determination of the entire tree as the path.

Figure 5:
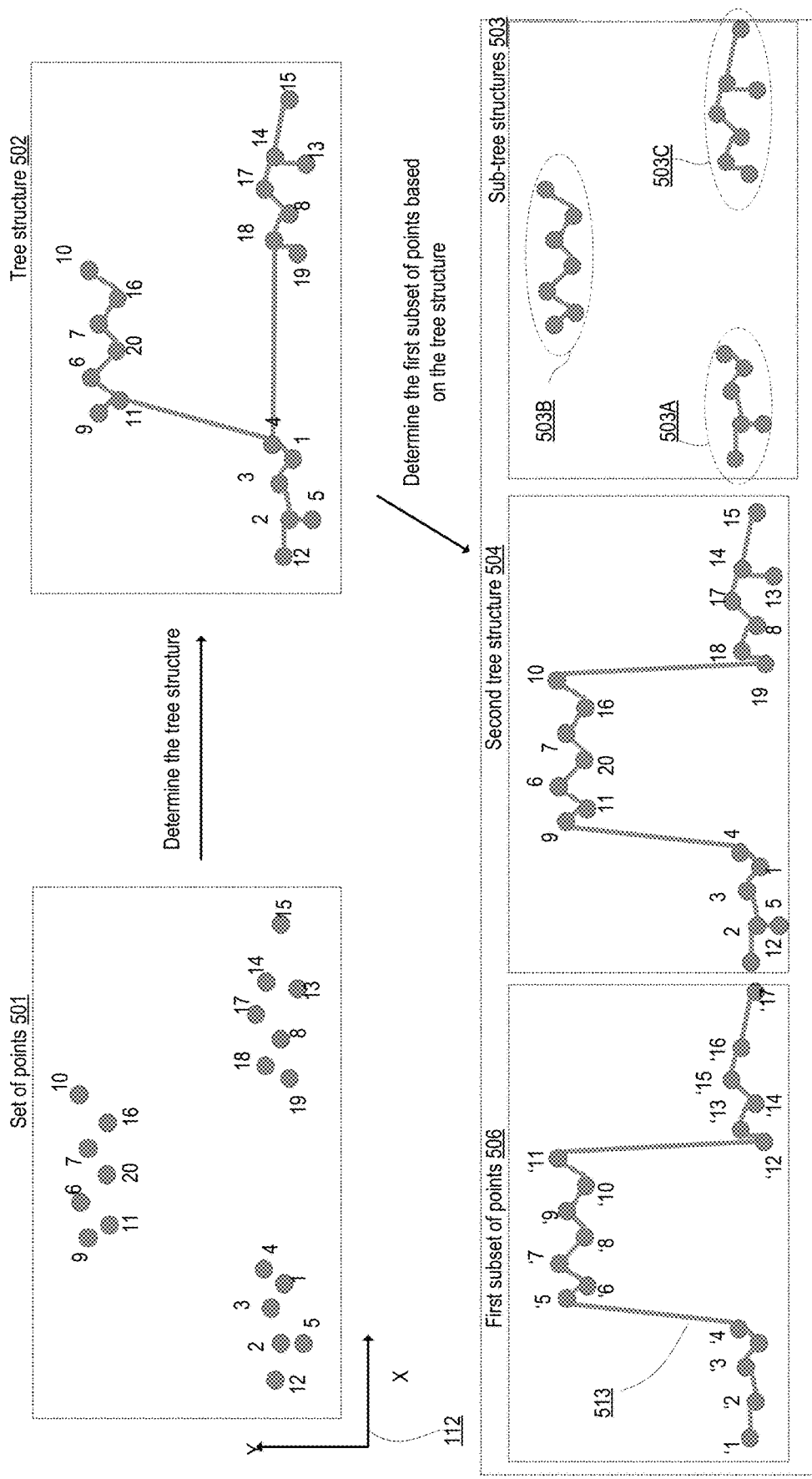
FIG. 5 illustrates a block diagram of an exemplary tree structure that does not include a path that satisfies the selection criterion of the contour of the first object, in accordance with some embodiments.

The first and the second embodiment described above, with respect to FIGS. 1A and 3, and with respect to FIGS. 4-5, respectively illustrate two mechanisms for determining from a set of unordered points a subset of points (103 or 506) that is ordered according to an orientation and which forms a path representative of the contour of an object. The subset of points can be connected according to the orientation to form a continuous curve that does not cross and with a minimum distance. Outliers have been removed from the set of points.

Determination of a Contour of a Second Object

In some embodiments, in addition to determining the first subset of points (103 or 506) from the received set of points (101 or 501), the contour comparison module further receives a third set of points (which may be referred to as a model set of points to which the first subset of points is to be compared) and this third set of points may need to be ordered to determine the second set of points. For example, the third set of points may not be ordered or may include outlier points that need to be removed in order to determine the second set of points that forms the contour of the second object.

Figure 6:
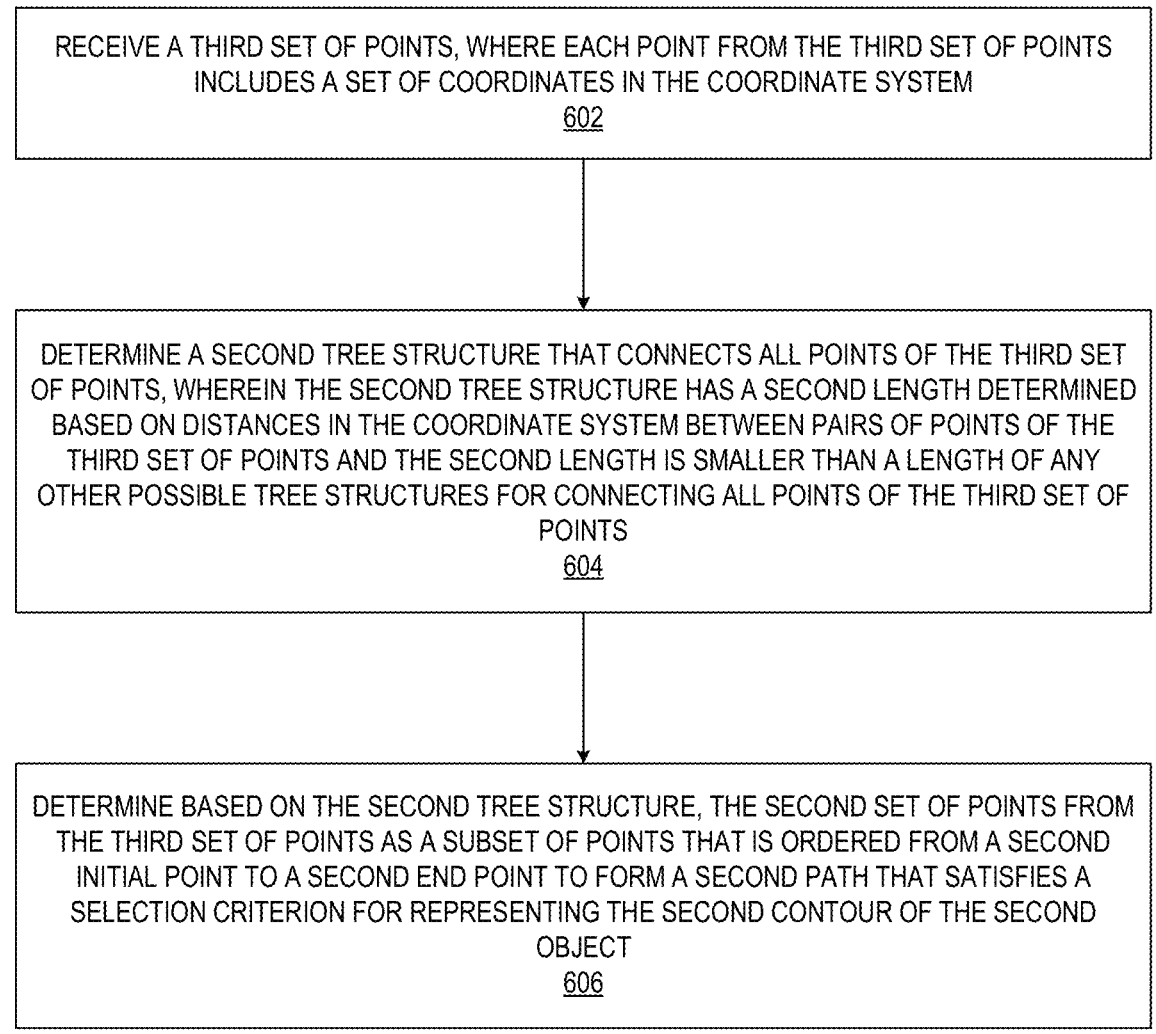
FIG. 6 illustrates a flow diagram of exemplary operations for determination of a second set of points that is representative of a second contour of a second object, in accordance with some embodiments.

FIG. 6 illustrates a flow diagram of exemplary operations for determination of a second set of points that is representative of a second contour of a second object, in accordance with some embodiments.

At operation 602, the contour comparison module receives a third set of points. Each one of the third set of points includes a set of coordinates in the coordinate system. At operation 604, the contour comparison module determines a second tree structure that connects all points of the third set of points. The second tree structure has a second length determined based on distances in the coordinate system between pairs of points of the third set of points and the second length is smaller than a length of any other possible tree structures for connecting all points of the third set of points. In some embodiments, the second tree structure is determined according to similar operations as the ones used for determination of the first tree structure in operation 204.

The flow then moves to operation 606, at which the contour comparison module determines, based on the second tree structure, the second set of points from the third set of points as a subset of points that is ordered from a second initial point to a second end point to form a second path that satisfies a selection criterion for representing the second contour of the second object. In some embodiments, the operation 606 can be performed according to the operations described for determining the first subset of points (operation 206). Several embodiments can be used to determine the second set of points. For example, operations similar to the ones described with respect to operation 302 in FIG. 3, or operations similar to the ones described with respect to 402-416 in FIG. 4 can be performed to determine the second set of points.

While FIG. 6 described an example in which the second set of points is obtained from a third set of points that is processed by the contour comparison module, in other embodiments, the second set of points is received by the contour comparison module already in a proper order, and including only points that are part of the contour of the second object. In these embodiments, the contour comparison module does not need to perform the additional operations of FIG. 6, and may immediately use the second set of points to perform the comparison between the first contour and the second contour, as defined by the first subset of points and the second set of points.

Determination of a Shape Representative of a Difference Between Two Contours

Once the first subset of points is determined and a second set of points is obtained, (where the first subset of points forms a path that represents the contour of the first object and the second set of points forms a second path that represents the contour of the second object) a shape representative of a difference between the two contours is determined. Referring back to FIG. 2, the determination of a shape representative of a difference between the two contours is performed at operation 208. At operation 208, the contour comparison module determines, from the first subset of points 103 and a second set of points that forms the second contour 114 of the second object, a set of points of interest. The set of points of interest forms a shape indicative of a difference between the first contour of the first object and the second contour of the second object. In the illustrated example of FIG. 1B, 115, 117, and 119 are three examples of sets of points of interest that can be determined from the first subset of points 103 (that forms the path 113) and the second set of points that forms the path 114.

The path 113 and the path 114 are traversed from one point to another to determine one or more closed shapes formed by sets of points from the first set of points 103 and the second set of points. For example, the shapes generated by the first points of interest 115, the second points of interest 117, and the third points of interest 119.

FIG. 7A illustrates a flow diagram of exemplary operations for determination of a set of points of interest, in accordance with a first exemplary embodiment. The contour comparison module determines, at operation 702, a second initial point of the second set of points that corresponds to the first initial point of the first subset of points. In one embodiment, when the first path (e.g., 113) and the second path (114) are open curves, the determination of the second initial point that corresponds to the first initial point includes selecting the first initial point 103A and the second initial point 116A. In another embodiment, when the first path and the second path are closed curves, the determination of two initial points that correspond to one another may include selecting randomly a first point from the first subset of points and determining the closest point from the second set of points (e.g., all distances from the first point to all the points of the second set of points are compared to determine the closest point). The closest point is then set as the initial point for the second set of points (which is referred to as the second initial point). The same process is repeated with the second initial point, where the closest point from the first subset of points to the second initial point is determined based on the distances between the second initial point and all points from the first subset of points. The closest point from the first subset of points is set as the initial point for the first subset of points. The operations of FIG. 7A result in the determination of the set of points 115 as the set of points of interest.

The flow then moves to operation 704, at which an intersection point of two segments is determined. The segments are a segment formed by two successive points (e.g., points '4 and '5) from the first subset of points 103 that succeed the first initial point 103A along the path 113 and the segment formed by two successive points (points "3 and "4) from the second set of points that succeed the second initial point 116A. In the illustrated example, the intersection point is point '5 that is part of the set of points 103. In other embodiments, the intersection point can be part of the second set of points or alternatively can be a new point that is not part of any of the sets of points.

The flow then moves to operation 706, at which the set of points of interest is selected from the first subset of points and the second set of points. The set of points of interest (e.g., 115) is selected to include the first initial point 103A, the second initial point (116A), the third intersection point (here point '5), and all points from the first subset of points (points '2, '3, and '4) and from the second set of points (points "2 and "3) that respectively succeed the first initial point 103A and the second initial point 116A, and which are prior to the intersection point ('5).

FIG. 7B illustrates a flow diagram of exemplary operations for determination of a set of points of interest, in accordance with a second exemplary embodiment. The operations of FIG. 7B result in the determination of the set of points 117 as the set of points of interest.

The contour comparison module determines, at operation 712, a first intersection point ('5) of a first segment formed by two successive points (e.g., points '4 and '5) from the first subset and a second segment formed by two successive points (points "3 and "4) from the second set of points.

The flow then moves to operation 714, at which a second intersection point (point 121) of a third segment and a fourth segment is determined. The third segment is formed by two successive points (points '13 and '14) from the first subset of points that succeed the first intersection point ('5) along the path and the fourth segment is formed by two successive points (points "14 and "15) from the second set of points that succeed the first intersection point ('5).

The flow then moves to operation 716, at which the set of points of interest is selected from the first subset of points and the second set of points to include the first intersection point ('5), the second intersection point (121), and all points from the first subset of points (points '6 to '13) and from the second set of points (points "4 to "14) that succeed the first intersection ('5) point and are prior to the second intersection point (121).

FIG. 7C illustrates a flow diagram of exemplary operations for determination of a set of points of interest, in accordance with a third exemplary embodiment. The operations of FIG. 7C result in the determination of the set of points 119 as the set of points of interest.

The contour comparison module determines, at operation 722, the intersection point (121) of the segment formed by two successive points (e.g., points '13 and '14) from the first subset and the segment formed by two successive points (points "14 and "15) from the second set of points.

The flow then moves to operation 724, at which the contour comparison module determines that there are no more intersections of segments formed by successive points from the first subset of points and segments formed by successive points from the second set of points. For example, the contour comparison module has traversed each one of the paths 113 and 114 and reached the end points (103B and 116B) without any of the segments of each one of the paths intersecting.

The flow then moves to operation 726, at which the set of points of interest is selected from the first subset of points and the second set of points to include the intersection point 121, the first end point 103B, the second end point 116B, and all points from the first subset of points (points '14 to '15) and from the second set of points (points "15 to "17) that respectively succeed the intersection point 121 and which are prior to the first end point 103B and the second end point 116B.

Each of the sets of points of interest forms a shape that is representative of a difference between the first contour of the first object and the second contour of the second object. While the presented example shows shapes (e.g., 115, 117, and 119) that have non-zero areas, in other examples, some sets of points of interest may form shapes that have a null area. Obtaining a shape with a null area is indicative that there is no difference between the first contour of the first object and the second contour of the second object.

Once the points of interest are selected, one or more characteristics of the shape can be computed to compare the first contour and the second contour. Referring back to FIG. 2, the determination of the characteristics is performed at operation 210. In one embodiment, the characteristics may include an area of the shape. For example, the area of the shape formed by the points of interest 115 is calculated, and a determination can be performed of whether this area is greater or not than a predetermined threshold. When the area is determined to be greater than the predetermined threshold this can be viewed as an indication that there is a significant difference between the contour of the first object and the contour of the second object.

Other types of characteristics can include a minimum Feret diameter of the shape, the number of points that form the shape, or a roundness measure determined from the shape, one or more angles in the shape, etc. In some embodiments, depending on the type of comparisons that need to be performed between the two contours, different types of characteristics of the shape can be calculated.

While the flow diagrams of FIGS. 7A-C illustrate different operations used to determine the set of points of interest, one of ordinary skill in the art will understand that the process can be performed based on different operations. For example, in operation, the contour comparison module may scan the first subset of points and the second set of points in the order obtained from the contour determination process and determine whether an intersection of segments occurred. Upon determination that an intersection of segments occurred, the intersection point is stored and one or more of the operations described with reference to FIGS. 7A-C are performed to detect the points of interest. Once a first set of points of interest is determined, the contour comparison module moves to process the remaining points from the first subset of points and the second set of points starting from the last point of intersection found. This process is repeated until all points from the first subset of points and the second set of points are all processed.

In some embodiments, the characteristics of a shape determined by a set of points of interest can be determined as soon as the points of interest are identified. Alternatively, the characteristics are determined once all the points of the first subset and all the points of the second set are processed, such that the characteristics of all the shapes are determined in a same mechanism.

FIG. 8 illustrates a flow diagram of exemplary operations for determining characteristics of a shape, in accordance with some embodiments. In some embodiments, the comparison of a first contour with another contour can be performed based on a sign of the area of the shape formed by the points of interest. For example, there may be a desire to know whether the first object includes more or less matter than the second object and therefore defining a sign of the area may indicate that. In one embodiment, the determination of the characteristics of the object includes operations

802-806. At operation 802, the contour comparison module defines an orientation in the coordinate system. The orientation (e.g., orientation 111) is defined based on a predetermined point 111A and a predetermined direction 111B. The point 111A and the direction 111B can be arbitrarily defined.

At operation 804, based on the orientation, a sign of the area of the shape formed by the first subset of points is determined. For example, depending on which of the first path 113 or the second path 114 intersects the orientation segment, a sign is determined for the area enclosed within the shape. For example, in the shape formed by the set of points of interest 117, the orientation segment intersects the second path prior to intersecting the first path 113, in this case the sign of the area is set to a positive orientation. The sign of the remaining shapes is determined based on the orientation. While the sign of the area formed by the set of points of interest 117 is determined to be positive, in other embodiments, the definition of the orientation can be set such that the sign of the area formed by the set of points of interest 117 is negative. In these alternative embodiments, the signs of the other two areas is the opposite sign (positive).

The flow of operations then moves to operation 806, at which the comparison of the first object and the second object is based on the sign of the area. For example, if a total area of difference between the two objects is to be determined, this area is determined by adding or subtracting the different areas depending on their sign. Further, the sign may enable an analyzer to determine whether the first object includes more or less matter than the second object.

Exemplary Environments
Points Extraction

Figure 9:
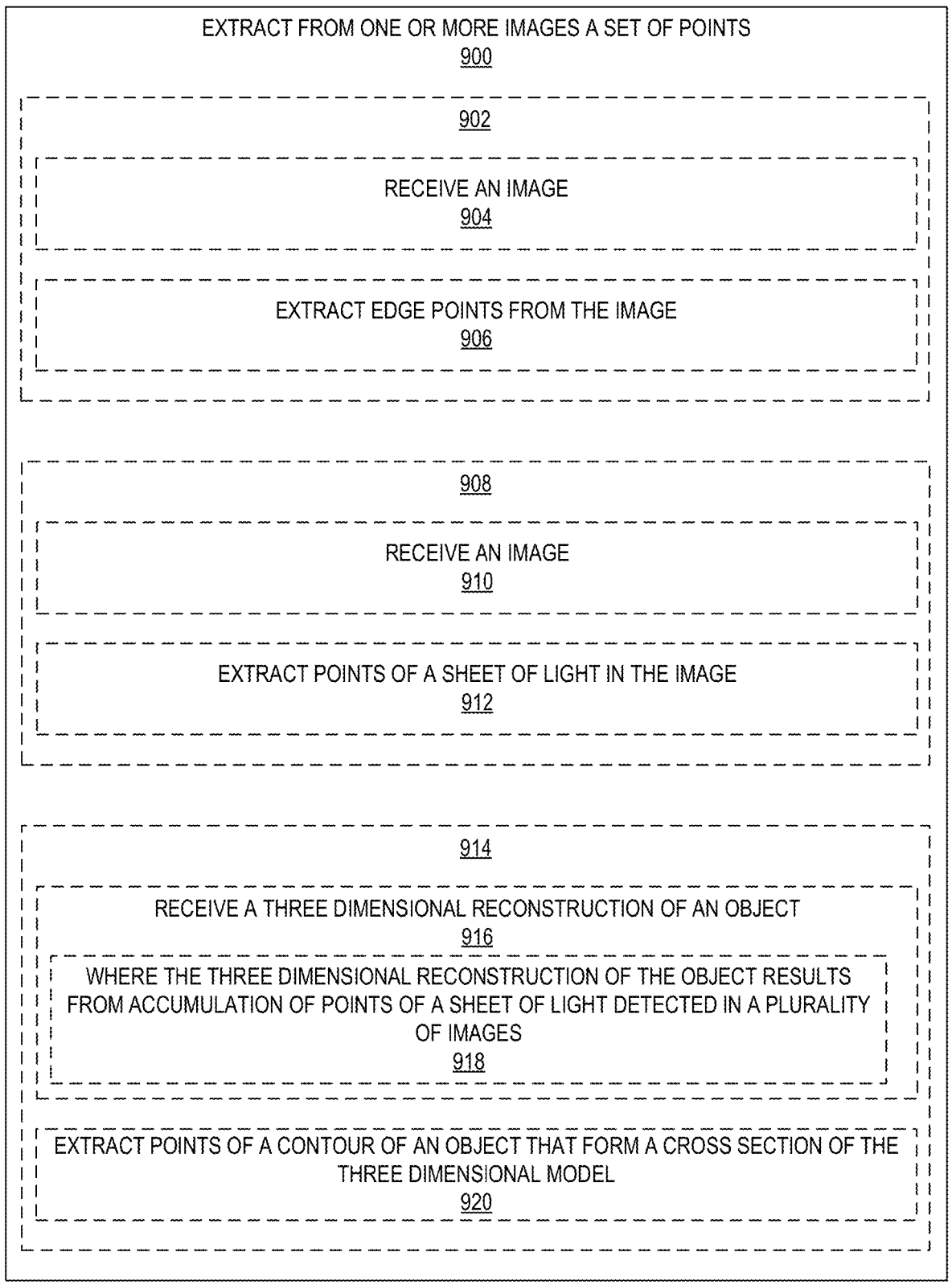
FIG. 9 illustrates a flow diagram of exemplary operations for extracting from one or more images a set of points, in accordance of some embodiments.

The embodiments described above can be used in multiple environments for comparing contours/profiles of two objects. Typically, the object of which the profile/contour is to be analyzed can be an object captured in one or more images in a manufacturing setting (tools manufacturing, electronics manufacturing, food industry, etc.) to enable inspection, quality, and quantity estimation. Further, the multiple embodiments can be applied to sets of points that are extracted from images based on multiple mechanisms. FIG. 9 illustrates a flow diagram of exemplary operations for extracting from one or more images a set of points, in accordance with some embodiments.

For example, the set of points can be points of a two-dimensional (2D) profile, points of a three-dimensional profile, or points of a three-dimensional cross-section. In a first embodiment (902), the points of a 2D profile can be obtained from the receipt (operation 904) of a 2D profile image of an object (e.g., where the object is backlit with a light source) and the extraction (operation 906) of edge points from the acquired image. In a second embodiment (908), the 3D profile points can be obtained from the acquisition (operation 910) of an image of an object illuminated by a sheet of light (e.g., a laser) from the light source 1012, as illustrated with reference to FIG. 10A, and extracting the set of points 1024 of the sheet of light from the acquired image.

Figure 10B:
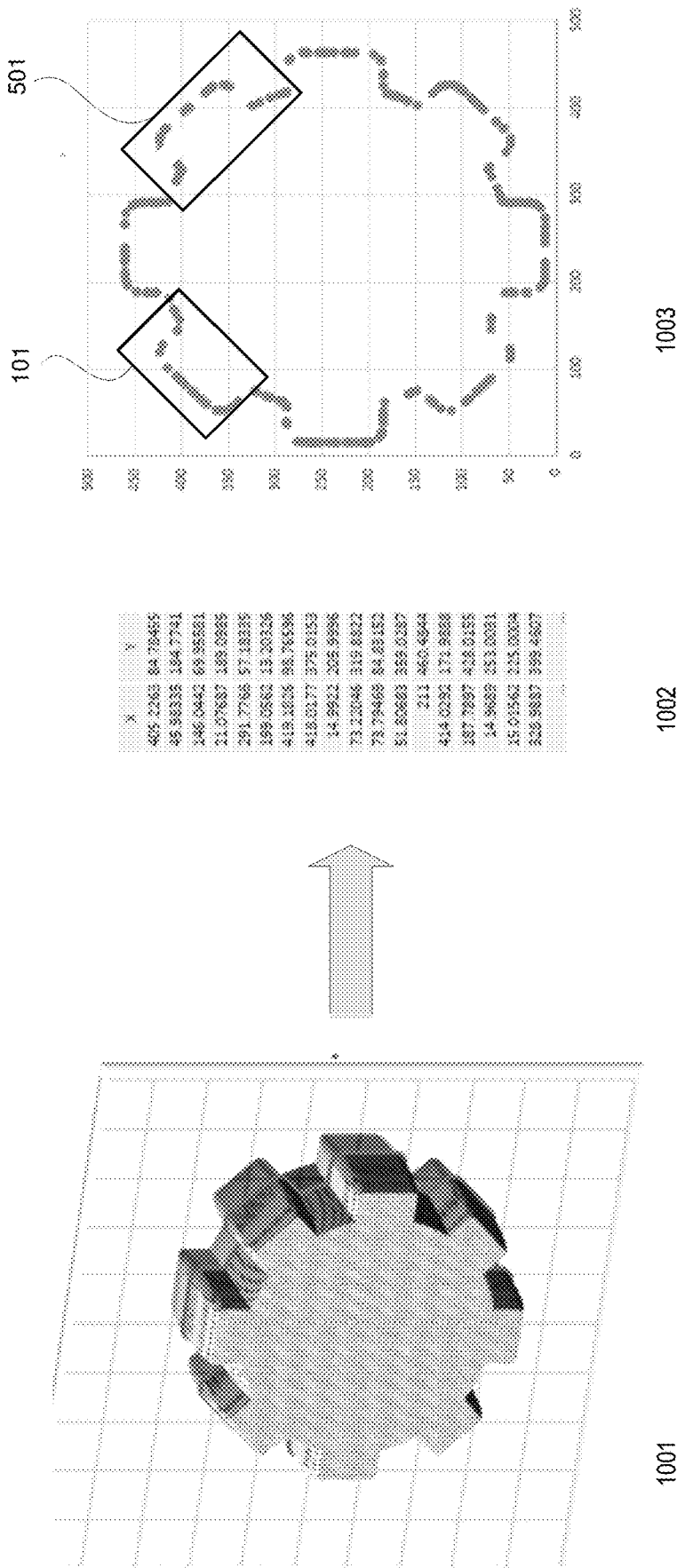
FIG. 10B illustrates a block diagram of a 3D object that is reconstructed from a plurality of images in which points of a sheet of light were determined, in accordance with some embodiments.

In some embodiments, an object illuminated by a sheet of light can be moving on a conveyor belt and following the extraction of the points, a 3D model of the object can be created. For example, FIG. 10B illustrated a 3D object that is reconstructed from a plurality of images in which points of a sheet of light were determined. 3D cross-section points (e.g., 1003) can be obtained by acquiring the 3D object (e.g., a depth map) by accumulating multiple 3D profiles and take a cross section of the 3D object. Thus, in a third embodiment, a three-dimensional reconstruction of an object is received (operation 916). The three-dimensional reconstruction of the object can result from accumulation of points of a sheet of light detected in multiple images. At operation 920, points of the contour of the object that form a cross section of the three-dimensional model are extracted (e.g., points 101, 501, or 1003).

While in the embodiments (914) the set of 3D points is described with reference to 3D points acquisition of mechanisms of a sheet-of-light, in other embodiments, 3D points may be provided through any 3D acquisition technology (Time-of-Flight, Stereoscopy, etc.) or from a computer-aided design (CAD) mechanism, without departing from the scope of the present invention.

In the multiple embodiments, the set of points obtained is typically not ordered, not equally spaced, or may contain outlier points that should not be part of the contour of the object (e.g., noise, other objects in the image, etc.).

Figure 11B:
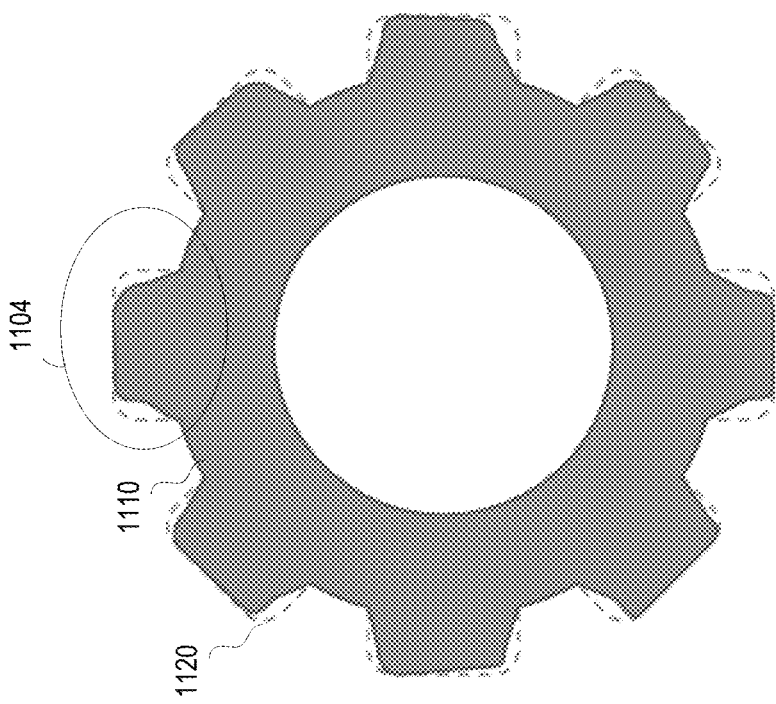
FIG. 11B illustrates exemplary object contours comparisons that may be performed based on the mechanisms described herein, in accordance with some embodiments.
Figure 11A:
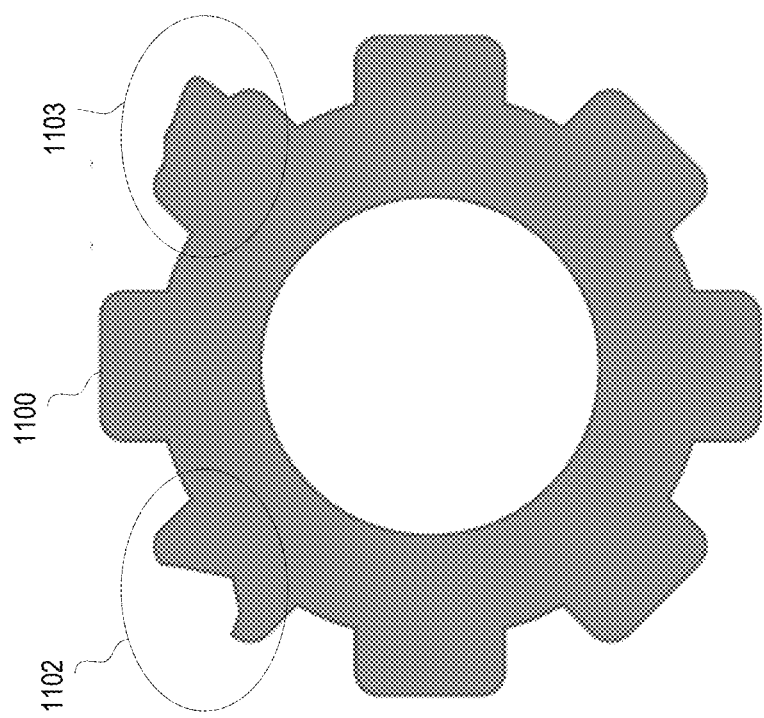
FIG. 11A illustrates exemplary object contours comparisons that may be performed based on the mechanisms described herein, in accordance with some embodiments.

FIGS. 11A-E illustrate exemplary object contours comparisons that may be performed based on the mechanisms described herein, in accordance with some embodiments. In the example of FIG. 11A, the mechanisms of contour comparison described herein can be used to identify defects of a manufactured object. For example, defect 1102 and defect 1103 can be detected. These defects can be evaluated (where the contour of the object 1100 is compared with the contour of a model object) by determining the shape formed from the set of points of interest (for the entire object or for a portion of the object) and calculating one or more characteristics of the shape. For example, the area of the shape is evaluated (with or without assigning a sign to the area). In some applications, if the area is greater than an acceptable value the object can be discarded. This may be used at the time of manufacture where images of the object are acquired during the manufacture process and the object can be discarded if not compliant with some quality requirements prior to moving to another step of the manufacture process.

In the example of FIG. 11B, the mechanisms of contour comparison described herein can be used to identify the state of wear of a manufactured object. For example, section 1103 can be detected and evaluated (where the contour of the object 1110 is compared with the contour of a model object 1120, shown in dotted lines) by determining the shape formed from the set of points of interest (for the entire object or for a portion of the object) and calculating one or more characteristics of the shape. For example, the area of the shape is evaluated. In some applications, if the area is greater than an acceptable value the object can be discarded. Alternatively, if the area is within the threshold value, the object continues to be used.

Figure 11D:
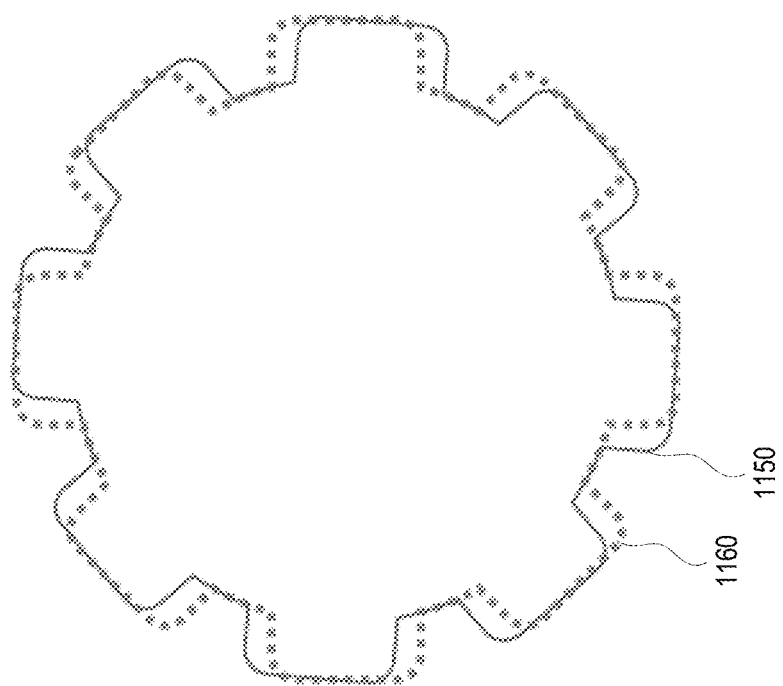
FIG. 11D illustrates exemplary object contours comparisons that may be performed based on the mechanisms described herein, in accordance with some embodiments.
Figure 11C:
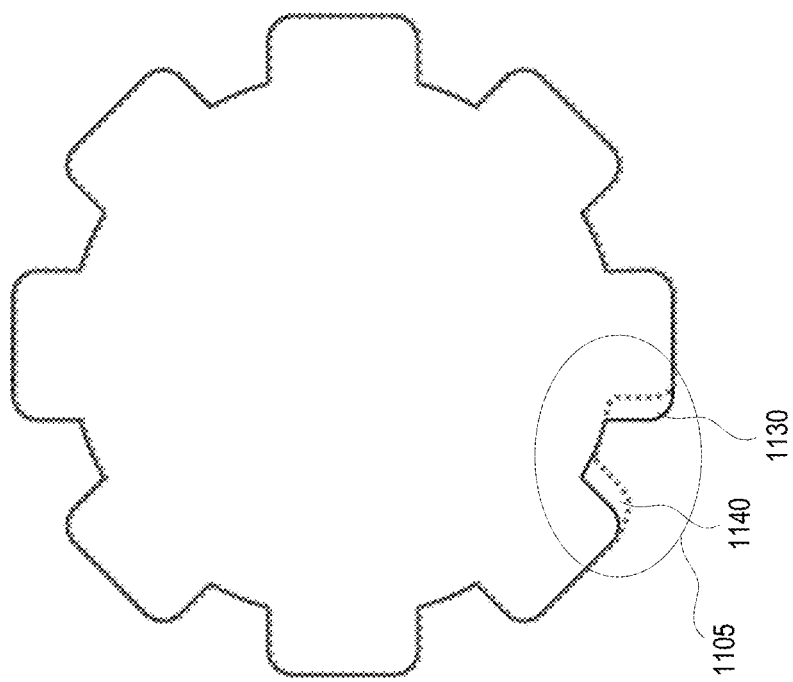
FIG. 11C illustrates exemplary object contours comparisons that may be performed based on the mechanisms described herein, in accordance with some embodiments.

In the example of FIG. 11C, the mechanisms of contour comparison described herein can be used to identify a misalignment of the tool used to manufacture the object. For example, section 1105 can be detected and evaluated (where the contour of the object 1130 is compared with the contour of a model object 1140, shown in dotted lines) by determining the shape formed from the set of points of interest and calculating one or more characteristics of the shape. For example, the area shapes formed by points of interest for the entire object is evaluated. By evaluating the signed sum area which is close to zero and evaluating the positive area which is not, the system may automatically conclude that there is an offset in the manufacturing tool used for manufacturing the object.

In the example of FIG. 11D, the mechanisms of contour comparison described herein can be used to identify a misalignment of the tool used to manufacture the object. For example, the sum area of unsigned shapes formed by points of interest for the entire object 1150 and the model object 1160 is evaluated. By using the sum of every unsigned areas, offset obtained with the rotation between the object and the model can be determined indicating the alignment adjustment that the manufacturing tool needs to have.

Figure 11E:
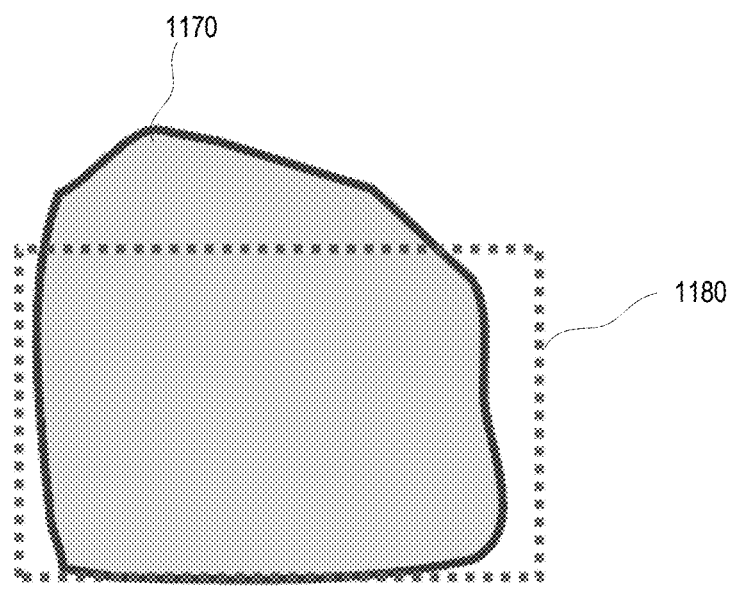
FIG. 11E illustrates exemplary object contours comparisons that may be performed based on the mechanisms described herein, in accordance with some embodiments.

FIG. 11E illustrates a block diagram of another type of use cases in which the contour comparison mechanisms can be performed. The object 1170 represents a piece of meat that is to be inspected and of which the area or the volume is to be determined. The model object 1180 is a representation of an ideal area for the object. The contour comparison mechanisms described above can be used to determine the signed area of the shape that represents the difference between the object 1170 and the model 1180. The signed area can be used to assess if the amount of material in the object 1170 is correct when compared with the desired amount of material of the model 1180.

In the embodiments described herein, the determination of points of interest forming a shape may allow to determine the differences between the contour of an object and the contour of another object. The points of interest are determined based on a subset of points selected from a set of input points for the object. The subset of points is efficiently determined based on a tree structure (first or a second tree structure) mechanism that allows a quick determination of the contour of an object. This efficient mechanism is extremely advantageous in manufacturing inspection environment in which frame rates of acquired images from the points are extracted are very high (in the order of hundreds, thousands or more per second) and these images need to be processed extremely fast to allow detection of defects or other measurements of manufactured pieces. Further, the mechanisms herein are robust to noise that may be present in the set of points extracted such that the noise is automatically filtered/removed in the tree structure.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 12:
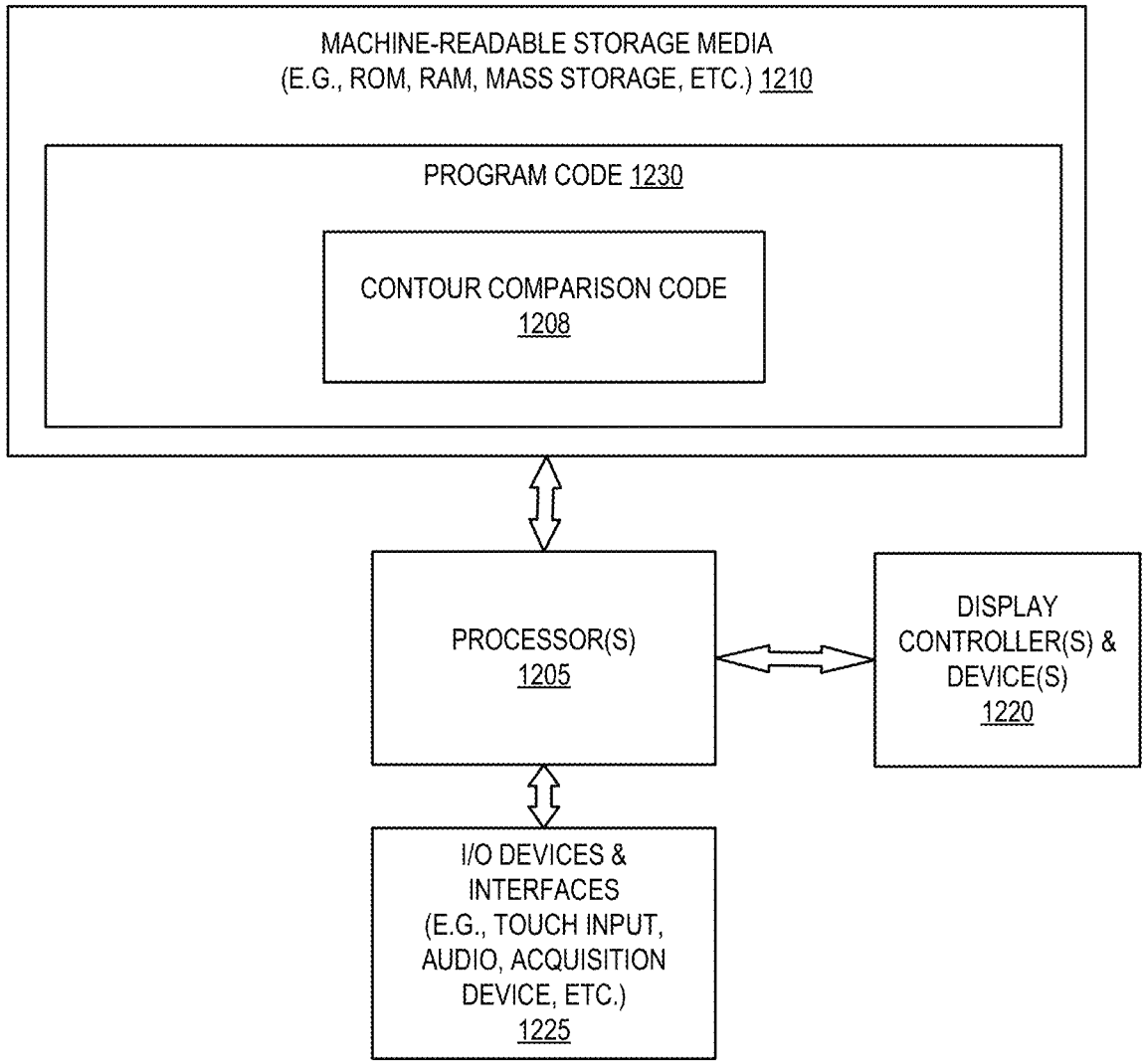
FIG. 12 is a block diagram illustrating an exemplary data processing system that may be used in some embodiments.

FIG. 12 illustrates a block diagram for an exemplary data processing system 1200 that may be used in some embodiments. Data processing system 1200 includes one or more processors 1205 and connected system components (e.g., multiple connected chips).

Alternatively, the data processing system 1200 is a system on a chip or Field-Programmable gate array. The data processing system 1200 can be included in a smart camera. One or more such data processing systems 1200 may be utilized to implement the functionality of a contour comparison module.

The data processing system 1200 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 1210 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 1205, and machine-readable transmission media (also called a carrier) (e.g., electrical, optical, radio, acoustical or other form of propagated signals—such as carrier waves, infrared signals). For example, the depicted machine-readable storage media 1210 may store contour comparison code 1208 that, when executed by the processor(s) 1205, causes the data processing system 1200 to compare contours of two objects as described with respect to the embodiments of FIGS. 1A-11E.

The data processing system 1200 also includes an audio input/output subsystem 1215 which may include a microphone and/or a speaker for, for example, playing back music or other audio, receiving voice instructions to be executed by the processor(s) 1205, playing audio notifications, etc. A display controller and display device 1220 provides a visual user interface for the user, e.g., GUI elements or windows.

The data processing system 1200 also includes one or more input or output ("I/O") devices and interfaces 1225, which are provided to allow a user to provide input to, receive output from, and otherwise transfer data to and from the system. These I/O devices 1225 may include a mouse, keypad, keyboard, a touch panel or a multi-touch input panel, camera, frame grabber, optical scanner, network interface, modem, other known I/O devices, or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1200.

The I/O devices and interfaces 1225 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1200 with another device, external component, or a network and receive stored instructions, data, tokens, etc. It will be appreciated that one or more buses may be used to interconnect the various components shown in FIG. 12.

It will be appreciated that additional components, not shown, may also be part of the system 1200, and, in certain embodiments, fewer components than that shown in FIG. 12 may also be used in a data processing system 1200. For example, in some embodiments the data processing system 1200 may include or be coupled with an image acquisition device for acquiring images of the sheet of light as projected onto an object of interest.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of comparing a first contour of a first object with a second contour of a second object, the method comprising:

receiving a set of points, wherein each point from the set of points includes a set of coordinates in a coordinate system;

determining a first tree structure that connects all points of the set of points, wherein a length of the first tree structure determined based on distances in the coordinate system between pairs of points of the set of points, is smaller than a length of any other possible tree structures for connecting all points of the set of points;

determining, based on the first tree structure, a first subset of the set of points that is ordered from a first initial point to a first end point to form a first path that satisfies a selection criterion for representing the first contour of the first object;

determining, from the first subset of points and a second set of points that forms the second contour of the second object, a set of points of interest that forms a shape indicative of a difference between the first contour of the first object and the second contour of the second object; and determining one or more characteristics of the shape formed by the set of points of interest to compare the first object and the second object.

2. The method of claim 1, wherein the determining a set of points of interest includes:

determining a first intersection point of a first segment formed by two successive points from the first subset and a second segment formed by two successive points from the second set of points;

determining a second intersection point of a third segment and a fourth segment, wherein the third segment is formed by two successive points from the first subset of points that succeed the first intersection point along the first path and the fourth segment is formed by two successive points from the second set of points that succeed the first intersection point; and selecting the set of points of interest from the first subset of points and the second set of points to include the first intersection point, the second intersection point, and all points from the first subset of points and from the second set of points that succeed the first intersection point and are prior to the second intersection point.

3. The method of claim 1, wherein the determining the set of points of interest includes:

determining a second initial point of the second set of points that corresponds to the first initial point of the first subset of points;

determining a third intersection point of a fifth segment and a sixth segment, wherein the fifth segment is formed by two successive points from the first subset of points that succeed the first initial point along the first path and the sixth segment is formed by two successive points from the second set of points that succeed the second initial point; and selecting the set of points of interest from the first subset of points and the second set of points to include the first initial point, the second initial point, the third intersection point, and all points from the first subset of points and from the second set of points that respectively succeed the first initial point and the second initial point, and which are prior to the third intersection point.

4. The method of claim 1, wherein the determining the set of points of interest includes:

determining a fourth intersection point of a seventh segment formed by two successive points from the first subset and an eighth segment formed by two successive points from the second set of points;

determining that there are no more intersections of segments formed by successive points from the first subset of points and segments formed by successive points from the second set of points; and selecting the set of points of interest from the first subset of points and the second set of points to include the fourth intersection point, the first end point, a second end point, and all points from the first subset of points and from the second set of points that respectively succeed the fourth intersection point and which are prior to the first end point and the second end point.

5. The method of claim 1 further comprising:
prior to determining the set of points of interest, determining that the first subset of points and the second set of points are ordered based on a same orientation.

6. The method of claim 1 further comprising:
receiving a third set of points, wherein each point from the third set of points includes a set of coordinates in the coordinate system;
determining a second tree structure that connects all points of the third set of points, wherein the second tree structure has a second length determined based on distances in the coordinate system between pairs of points of the third set of points and the second length is smaller than a length of any other possible tree structures for connecting all points of the third set of points; and
determining, based on the second tree structure, the second set of points from the third set of points as a subset of points that is ordered from a second initial point to a second end point to form a second path that satisfies a selection criterion for representing the second contour of the second object.

7. The method of claim 1, wherein the selection criterion includes at least one of a maximum number of points from the set of points, the greatest accumulated length, and the densest subset of points.

8. A non-transitory computer readable storage medium that provides instructions, which when executed by a processor, cause said processor to perform operations comprising:
receiving a set of points, wherein each point from the set of points includes a set of coordinates in a coordinate system;
determining a first tree structure that connects all points of the set of points, wherein a length of the first tree structure determined based on distances in the coordinate system between pairs of points of the set of points, is smaller than a length of any other possible tree structures for connecting all points of the set of points;
determining, based on the first tree structure, a first subset of the set of points that is ordered from a first initial point to a first end point to form a first path that satisfies a selection criterion for representing a first contour of a first object;
determining, from the first subset of points and a second set of points that forms a second contour of a second object, a set of points of interest that forms a shape indicative of a difference between the first contour of the first object and the second contour of the second object; and
determining one or more characteristics of the shape formed by the set of points of interest to compare the first object and the second object.

9. The non-transitory computer readable storage medium of claim 8, wherein the determining a set of points of interest includes:
determining a first intersection point of a first segment formed by two successive points from the first subset and a second segment formed by two successive points from the second set of points;
determining a second intersection point of a third segment and a fourth segment, wherein the third segment is formed by two successive points from the first subset of points that succeed the first intersection point along the first path and the fourth segment is formed by two successive points from the second set of points that succeed the first intersection point; and
selecting the set of points of interest from the first subset of points and the second set of points to include the first intersection point, the second intersection point, and all points from the first subset of points and from the second set of points that succeed the first intersection point and are prior to the second intersection point.

10. The non-transitory computer readable storage medium of claim 8, wherein the determining the set of points of interest includes:
determining a second initial point of the second set of points that corresponds to the first initial point of the first subset of points;
determining a third intersection point of a fifth segment and a sixth segment, wherein the fifth segment is formed by two successive points from the first subset of points that succeed the first initial point along the first path and the sixth segment is formed by two successive points from the second set of points that succeed the second initial point; and
selecting the set of points of interest from the first subset of points and the second set of points to include the first initial point, the second initial point, the third intersection point, and all points from the first subset of points and from the second set of points that respectively succeed the first initial point and the second initial point, and which are prior to the third intersection point.

11. The non-transitory computer readable storage medium of claim 8, wherein the determining the set of points of interest includes:
determining a fourth intersection point of a seventh segment formed by two successive points from the first subset and an eighth segment formed by two successive points from the second set of points;
determining that there are no more intersections of segments formed by successive points from the first subset of points and segments formed by successive points from the second set of points; and
selecting the set of points of interest from the first subset of points and the second set of points to include the fourth intersection point, the first end point, a second end point, and all points from the first subset of points and from the second set of points that respectively succeed the fourth intersection point and which are prior to the first end point and the second end point.

12. The non-transitory computer readable storage medium of claim 8, wherein the operations further comprise:
prior to determining the set of points of interest, determining that the first subset of points and the second set of points are ordered based on a same orientation.

13. The non-transitory computer readable storage medium of claim 8, wherein the operations further comprise:
receiving a third set of points, wherein each point from the third set of points includes a set of coordinates in the coordinate system;
determining a second tree structure that connects all points of the third set of points, wherein the second tree structure has a second length determined based on distances in the coordinate system between pairs of points of the third set of points and the second length is smaller than a length of any other possible tree structures for connecting all points of the third set of points; and determining, based on the second tree structure, the second set of points from the third set of points as a subset of points that is ordered from a second initial point to a second end point to form a second path that satisfies a selection criterion for representing the second contour of the second object.

14. The non-transitory computer readable storage medium of claim 8, wherein the selection criterion includes at least one of a maximum number of points from the set of points, the greatest accumulated length, and the densest subset of points.

15. An image processing system comprising:
one or more processors; and
a non-transitory computer readable storage medium to store code, which when executed by the one or more processors causes the image processing system to:
receive a set of points, wherein each point from the set of points includes a set of coordinates in a coordinate system;
determine a first tree structure that connects all points of the set of points, wherein a length of the first tree structure determined based on distances in the coordinate system between pairs of points of the set of points, is smaller than a length of any other possible tree structures for connecting all points of the set of points;
determine, based on the first tree structure, a first subset of the set of points that is ordered from a first initial point to a first end point to form a first path that satisfies a selection criterion for representing a first contour of a first object;
determine, from the first subset of points and a second set of points that forms a second contour of a second object, a set of points of interest that forms a shape indicative of a difference between the first contour of the first object and the second contour of the second object; and
determine one or more characteristics of the shape formed by the set of points of interest to compare the first object and the second object.

16. The image processing system of claim 15, wherein to determine a set of points of interest includes to:
determine a first intersection point of a first segment formed by two successive points from the first subset and a second segment formed by two successive points from the second set of points;
determine a second intersection point of a third segment and a fourth segment, wherein the third segment is formed by two successive points from the first subset of points that succeed the first intersection point along the first path and the fourth segment is formed by two successive points from the second set of points that succeed the first intersection point; and
select the set of points of interest from the first subset of points and the second set of points to include the first intersection point, the second intersection point, and all points from the first subset of points and from the second set of points that succeed the first intersection point and are prior to the second intersection point.

17. The image processing system of claim 15, wherein to determine the set of points of interest includes to:
determine a second initial point of the second set of points that corresponds to the first initial point of the first subset of points;
determine a third intersection point of a fifth segment and a sixth segment, wherein the fifth segment is formed by two successive points from the first subset of points that succeed the first initial point along the first path and the sixth segment is formed by two successive points from the second set of points that succeed the second initial point; and
select the set of points of interest from the first subset of points and the second set of points to include the first initial point, the second initial point, the third intersection point, and all points from the first subset of points and from the second set of points that respectively succeed the first initial point and the second initial point, and which are prior to the third intersection point.

18. The image processing system of claim 15, wherein to determine the set of points of interest includes to:
determine a fourth intersection point of a seventh segment formed by two successive points from the first subset and an eighth segment formed by two successive points from the second set of points;
determine that there are no more intersections of segments formed by successive points from the first subset of points and segments formed by successive points from the second set of points; and
select the set of points of interest from the first subset of points and the second set of points to include the fourth intersection point, the first end point, the second end point, and all points from the first subset of points and from a second set of points that respectively succeed the fourth intersection point and which are prior to the first end point and the second end point.

19. The image processing system of claim 15, wherein the image processing system is further to:
prior to determining the set of points of interest, determine that the first subset of points and the second set of points are ordered based on a same orientation.

20. The image processing system of claim 15, wherein the image processing system is further to:
receive a third set of points, wherein each point from the third set of points includes a set of coordinates in the coordinate system;
determine a second tree structure that connects all points of the third set of points, wherein the second tree structure has a second length determined based on distances in the coordinate system between pairs of points of the third set of points and the second length is smaller than a length of any other possible tree structures for connecting all points of the third set of points; and
determine, based on the second tree structure, the second set of points from the third set of points as a subset of points that is ordered from a second initial point to a second end point to form a second path that satisfies a selection criterion for representing the second contour of the second object.

21. The image processing system of claim 15, wherein the selection criterion includes at least one of a maximum number of points from the set of points, the greatest accumulated length, and the densest subset of points.

* * * * *